United States Patent
Yanagida et al.

(10) Patent No.: US 9,130,345 B2
(45) Date of Patent: Sep. 8, 2015

(54) SYSTEM AND METHOD FOR GENERATING EXTREME ULTRAVIOLET LIGHT, AND LASER APPARATUS

(71) Applicant: GIGAPHOTON, INC., Oyama-shi, Tochigi (JP)

(72) Inventors: Tatsuya Yanagida, Hiratsuka (JP); Osamu Wakabayashi, Hiratsuka (JP)

(73) Assignee: GIGAPHOTON INC., Tochigi (JP)

( * ) Notice: Subject to any disclaimer, the term of this patent is extended or adjusted under 35 U.S.C. 154(b) by 0 days.

(21) Appl. No.: 14/152,813

(22) Filed: Jan. 10, 2014

(65) Prior Publication Data

US 2014/0124685 A1    May 8, 2014

Related U.S. Application Data

(63) Continuation of application No. 13/126,671, filed as application No. PCT/JP2011/058468 on Mar. 25, 2011, now Pat. No. 8,669,543.

(30) Foreign Application Priority Data

Mar. 29, 2010 (JP) .................................. 2010-076268
Nov. 12, 2010 (JP) .................................. 2010-254251

(51) Int. Cl.
  *H05G 2/00* (2006.01)
  *H01S 3/10* (2006.01)

(52) U.S. Cl.
  CPC ............ *H01S 3/10061* (2013.01); *H05G 2/003* (2013.01); *H05G 2/008* (2013.01)

(58) Field of Classification Search
  CPC ............ G03F 7/70033; G03F 7/70191; G03F 7/70041; G03F 7/7005; H05G 2/008; H05G 2/003; H05G 2/005; H01S 3/10061

USPC .......... 250/396 ML, 504 R, 423 P, 325, 372; 315/111.01, 111.41; 372/2, 26, 27, 31, 372/55
  See application file for complete search history.

(56) References Cited

U.S. PATENT DOCUMENTS 5,375,130 A * 12/1994 Shih ................................ 372/2
5,617,246 A *  4/1997 Hiiro ........................ 359/489.07

(Continued)

FOREIGN PATENT DOCUMENTS

JP    2003-270551 A    9/2003
JP    2005-017274 A    1/2005

(Continued)

OTHER PUBLICATIONS

S. Ter-Avetisyan et al., "Absolute extreme ultraviolet yield from femtosecond-laser-excited Xe clusters", Physical Review E., vol. 64, pp. 036404-01-036404-8, 2001.

(Continued)

*Primary Examiner* — Vibol Tan
(74) *Attorney, Agent, or Firm* — McDermott Will & Emery LLP

(57) ABSTRACT

An extreme ultraviolet light generation system used with a laser apparatus may be provided, and the extreme ultraviolet light generation system may include: a chamber including at least one window for at least one laser beam and a target supply unit for supplying a target material into the chamber; and at least one polarization control unit, provided on a laser beam path, for controlling a polarization state of the at least one laser beam.

4 Claims, 38 Drawing Sheets

(56) References Cited

U.S. PATENT DOCUMENTS

| | | |
|---|---|---|
| 7,880,153 B2 | 2/2011 | Suganuma et al. |
| 2006/0215715 A1 | 9/2006 | Kouta et al. |
| 2008/0087840 A1* | 4/2008 | Ueno et al. ............ 250/396 ML |
| 2008/0149862 A1 | 6/2008 | Hansson et al. |
| 2008/0210889 A1 | 9/2008 | Suganuma et al. |
| 2009/0161201 A1 | 6/2009 | Ershov et al. |
| 2009/0314967 A1* | 12/2009 | Moriya et al. ............ 250/504 R |
| 2010/0078577 A1* | 4/2010 | Moriya et al. ............ 250/504 R |
| 2010/0193710 A1 | 8/2010 | Wakabayashi et al. |
| 2011/0058588 A1 | 3/2011 | Ershov et al. |

FOREIGN PATENT DOCUMENTS

| | | |
|---|---|---|
| JP | 2005-243624 A | 9/2005 |
| JP | 2007-266234 A | 10/2007 |
| JP | 2008-277481 A | 11/2008 |
| JP | 2009-218323 A | 9/2009 |
| JP | 2010-021543 A | 1/2010 |

OTHER PUBLICATIONS

Hou et al., "Directional properties of hard x-ray sources generated by tightly focused ultrafast laser pulses", Applied Physics Letter 93, pp. 201503-1-201503-3, 2008.

International Search Report and Written Opinion of the International Search Authority, issued in corresponding International Patent Application No. PCT/JP2011/058468, mailed Jun. 28, 2011.

United States Office Action issued in U.S. Appl. No. 13/126,671, dated Jul. 11, 2012.

United States Notice of Allowance issued in U.S. Appl. No. 13/126,671, dated Oct. 21, 2013.

Notice of Rejection Japanese Patent Application No. 2010-254251 dated Dec. 24, 2014 with English translation.

* cited by examiner

10ns TO 10μs

SYSTEM AND METHOD FOR GENERATING EXTREME ULTRAVIOLET LIGHT, AND LASER APPARATUS

CROSS-REFERENCE TO RELATED APPLICATIONS

The present application is Continuation of application Ser. No. 13/126,671 filed on Dec. 14, 2011, which is the U.S. National Phase under 35 U.S.C. §371 of International Application No. PCT/JP2011/058468, filed on Mar. 25, 2011, which in turn claims priority from Japanese Patent Application No. 2010-076268 filed on Mar. 29, 2010, and Japanese Patent Application No. 2010-254251 filed on Nov. 12, 2010, the disclosure of each of which is incorporated herein by reference in its entirety.

BACKGROUND

1. Technical Field

This disclosure relates to a system and a method for generating extreme ultraviolet light and to a laser apparatus.

2. Related Art

With recent increase in integration of semiconductor devices, transfer patterns for use in photolithography of a semiconductor process have rapidly become finer. In the next generation, microfabrication at 70 to 45 nm, further, microfabrication at 32 nm or less is to be demanded. Accordingly, for example, to meet the demand for microfabrication at 32 nm or less, an exposure apparatus is expected to be developed, where an extreme ultraviolet (EUV) light generation system generating EUV light of a wavelength of approximately 13 nm is combined with a reduction projection reflective optical system.

There are mainly three types of EUV light generation systems, namely, a laser produced plasma (LPP) type system using plasma produced by applying a laser beam onto a target, a discharge produced plasma (DPP) type system using plasma produced by discharge, and a synchrotron radiation type system using orbital radiation.

SUMMARY

An extreme ultraviolet light generation system in accordance with one aspect of this disclosure may be used with a laser apparatus, and the extreme ultraviolet light generation system may include: a chamber including at least one window for at least laser one beam and a target supply unit for supplying a target material into the chamber; and at least one polarization control unit, provided on a laser beam path, for controlling a polarization state of the at least one laser beam.

A laser apparatus for outputting a laser beam used to generate extreme ultraviolet light in accordance with another aspect of this disclosure may include a polarization control unit that controls a polarization state of the laser beam.

A method for generating extreme ultraviolet light by irradiating a target material with at least one laser beam in accordance with yet another aspect of this disclosure may include controlling a polarization state of the at least one laser beam.

These and other objects, features, aspects, and advantages of this disclosure will become apparent to those skilled in the art from the following detailed description, which, taken in conjunction with the annexed drawings, discloses preferred embodiments of this disclosure.

DESCRIPTION OF PREFERRED EMBODIMENTS

Figure 1:
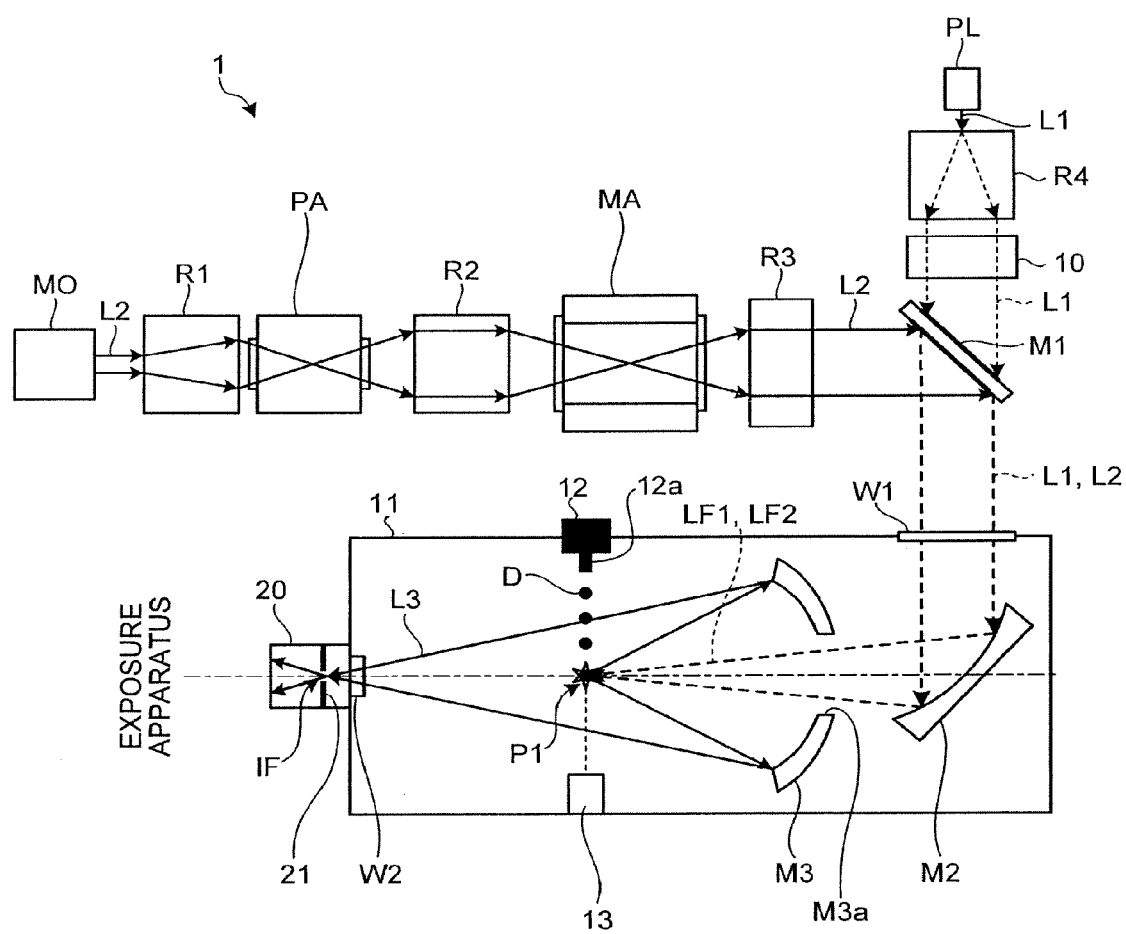
FIG. 1 schematically illustrates a configuration of an EUV light generation system in accordance with a first embodiment of this disclosure.

Hereinafter, selected embodiments for implementing this disclosure will be described in detail with reference to the accompanying drawings. In the subsequent description, each drawing merely illustrates shape, size, and/or positional relationship of members schematically to the extent that enables the content of this disclosure to be understood. Accordingly, this disclosure is not limited to the shape, the size, and/or the positional relationship of the members illustrated in each drawing. In order to show the configuration clearly in the drawings, part of hatching along a section is omitted. Further, numerical values indicated hereafter are merely preferred examples of this disclosure. Accordingly, this disclosure is not limited to the indicated numerical values.

First Embodiment

An EUV light generation system in accordance with a first embodiment of this disclosure will be described in detail with reference to drawings. In the following description, a case where a target material is turned into plasma with two-stage laser irradiation will be shown as an example. The first embodiment, however, is not limited thereto.

FIG. 1 schematically illustrates a configuration of an EUV light generation system 1 in accordance with the first embodiment. As illustrated in FIG. 1, the EUV light generation system 1 in accordance with the first embodiment may comprise: a driver laser for outputting laser beams (pre-pulse laser beam L1 and main pulse laser beam L2) to strike a target material; a chamber 11 in which EUV light is generated; and a focusing optical system for focusing the laser beams (L1 and L2) outputted from the driver laser at a predetermined site inside the chamber 11.

The driver laser may include a pre-pulse laser device and a main pulse laser device. The pre-pulse laser device may include a pre-pulse laser PL, a relay optical system R4, and a polarization control mechanism 10. The main pulse laser device may include a master oscillator MO, a pre-amplifier PA, a main amplifier MA, and relay optical systems R1 through R3.

The pre-pulse laser PL may output the pre-pulse laser beam L1. The pre-pulse laser beam L1 may strike the target material supplied into the chamber 11, whereby the target material may be turned into a diffused target. The term "diffused target" is defined herein as a target including at least one of pre-plasma and a fragment. The term "pre-plasma" is defined herein as a plasma state or a state in which plasma and an atom or a molecule coexist. The term "fragment(s)" is defined herein as a cluster formed of a target material that has been irradiated with a laser beam and been fragmented, a cloud of micro-droplet(s), or a minute particulate group in which the cluster and the micro-droplet(s) coexist.

The pre-pulse laser beam L1 outputted from the pre-pulse laser PL may have the beam profile thereof expanded by the relay optical system R4. The pre-pulse laser beam L1, then, may have the polarization state thereof controlled by the polarization control mechanism 10. The pre-pulse laser beam L1, of which the polarization state has been controlled, may pass through a laser beam introduction mirror M1 of the focusing optical system. Thereafter, the pre-pulse laser beam L1 may pass through a window W1 provided to the chamber 11, be reflected by an off-axis paraboloidal mirror M2 disposed inside the chamber 11, and be focused at a predetermined site (plasma generation region P1) inside the chamber 11. The off-axis paraboloidal mirror M2 may be disposed outside the chamber 11. If this is the case, the laser beam reflected by the off-axis paraboloidal mirror M2 may enter the chamber 11 through the window W1 and be focused at the predetermined site (plasma generation region P1) inside the chamber 11. In a case where a space through which the pre-pulse laser beam L1 and/or the main pulse laser beam L2 travel(s) is maintained substantially at internal pressure of the chamber 11, the window W1 may be omitted. In such case, an through-hole for the laser beam to pass therethrough may preferably be provided to the chamber 11.

The master oscillator MO may output the main pulse laser beam L2. The pre-amplifier PA and the main amplifier MA may each include a gain medium thereinside, and the gain medium may amplify a laser beam of at least one predetermined wavelength. The master oscillator MO may preferably output the main pulse laser beam L2 of a wavelength that matches with the above predetermined wavelength. The master oscillator MO may, without being limited to the following, be a laser oscillator configured to output a single-line laser beam or a multi-line laser beam, or the master oscillator MO include a plurality of laser oscillators each configured to output a single-line laser beam or a multi-line laser beam and a combiner for combining the laser beams outputted from the plurality of the laser oscillators and outputting the combined laser beam as the laser beam L2. The laser oscillator may, without being limited to the following, be a semiconductor laser oscillator such as a quantum cascade laser, a gas laser oscillator such as a $CO_2$ gas laser, a solid-state laser oscillator such as an optical parametric oscillator including a nonlinear crystal, or a distributed-feedback laser oscillator. The master oscillator MO may include a wavelength selection unit such as a grating or the like configured to selectively isolate only a laser beam of a desired wavelength band from the laser beam outputted from the laser oscillator. This configuration makes it possible to match the wavelength of the laser beam outputted from the master oscillator MO with the gain bandwidth of an amplifier (pre-amplifier PA, main amplifier MA) disposed downstream of the master oscillator MO in the beam path. The master oscillator MO may further include a resonator length regulating unit for regulating the resonator length so as to control a wavelength of a laser beam outputted from the laser oscillator.

The relay optical system R1 may adjust the beam profile of the main pulse laser beam L2 so that the main pulse laser beam L2 is efficiently amplified in the pre-amplifier PA. The pre-amplifier PA may be an amplifier including a gain medium containing $CO_2$ gas, for example. The pre-amplifier PA may amplify a laser beam outputted from the master oscillator MO, of which the wavelength matches with the gain bandwidth of the pre-amplifier PA.

The relay optical system R2 may adjust the beam profile of the main pulse laser beam L2, which has been amplified in the pre-amplifier PA, so that the main pulse laser beam L2 may further be amplified in the main amplifier MA efficiently. The main amplifier MA, as in the pre-amplifier PA, may be an amplifier including a gain medium containing $CO_2$ gas, for example. The main amplifier MA may amplify, of the main pulse laser beam L2 which has been amplified in the pre-amplifier PA, a laser beam, of which the wavelength matches with the gain bandwidth of the main amplifier MA. In the first embodiment, a gain medium of the same type may be used in both the pre-amplifier PA and the main amplifier MA; thus, the wavelengths of the laser beams to be amplified therein are substantially the same.

The main pulse laser beam L2, which has been amplified in the main amplifier MA, may then passes through the relay optical system R3, whereby the divergence angle thereof is adjusted and the main pulse laser beam L1 is substantially collimated. The main pulse laser beam L2 may then be reflected by the laser beam introduction mirror M1 of the focusing optical system and may thereafter be introduced into the chamber 11, traveling along substantially the same beam path as the pre-pulse laser beam L1. The main pulse laser beam 2 having been introduced into the chamber 11 may be reflected by the off-axis paraboloidal mirror M2 to thereby be focused at a predetermined site (plasma generation region P1) inside the chamber 11.

The chamber 11 may be provided with a droplet generator 12. The droplet generator 12 may store a target material thereinside and can output the target material toward the plasma generation region P1. The target material may, for example, be Sn. Sn may be stored in the droplet generator 12 in a molten state. The droplet generator 12 may comprise a nozzle 12a, through which a droplet D may be outputted. The droplet generator 12 may be configured such that pressure is applied to the molten Sn thereinside, for example, which causes the molten Sn to be outputted as a liquid droplet (droplet D) through the tip of the nozzle 12a. The droplet generator 12, however, is not limited to this configuration. For example, in addition to or in place of this configuration, an electrode may be disposed so as to face the nozzle 12a, and the molten Sn may be pulled out through the nozzle 12a, in the form of the droplet D, by electrostatic force acting between the tip of the nozzle 12a and the target material. At timing when the droplet D outputted from the droplet generator 12 arrives in the plasma generation region P1, the droplet D may be irradiated with the pre-pulse laser beam L1. With this, the droplet D may be transformed into the diffused target in the plasma generation region P1. Te diffused target is further diffused over time, and a range in which the constituent particles thereof exist is increased. A range in which the constituent particles exist at or above predetermined density is defined as the size of the diffused target. At timing when the diffused target reaches a predetermined size (for example, 10 ns to 10 μs after irradiation of the pre-pulse laser beam L1), the diffused target may be irradiated with the main pulse laser beam L2. With this, the diffused target may be heated and turned into plasma.

Inside the chamber 11, a target collection unit 13 may be provided for collecting droplets D which have not been irradiated with a laser beam and have passed through the plasma generation region P1, a part of a droplet D which has not been diffused by laser beam irradiation, or the like.

An EUV collector mirror M3 may further be provided in the chamber 11, the EUV collector mirror M3 selectively reflecting at least EUV light L3 among light emitted from the plasma generated in the plasma generation region. The EUV collector mirror M3 may, for example, be disposed between the off-axis paraboloidal mirror M2 and the plasma generation region P1 with the reflective surface of the EUV collector mirror M3 facing the plasma generation region P1. The shape of the reflective surface is, for example, spheroidal. The EUV collector mirror M3 may preferably be positioned such that a first focus of the spheroidal reflective surface coincides with the plasma generation region P1. The EUV collector mirror M3 may be provided with a through-hole Mia at a center portion thereof in an axial direction thereof, for example. The laser beams (L1 and L2) reflected by the off-axis paraboloidal mirror M2 may pass through the through-hole Mia and be focused in the plasma generation region.

The EUV light L3 may be reflected by the EUV collector mirror M3 and focused at a second focus of the spheroidal surface. The second focus may be referred to as an intermediate focus IF. At a connection between the chamber 11 and an exposure device (not shown), an exposure device connection unit 20 is preferably provided, and the exposure device connection unit 20 is preferably provided with a partition wall 21 having a pinhole formed therein. The EUV light L3 focused at the intermediate focus IF may pass through the pinhole in the partition wall 21 and be introduced into the exposure device via an optical system (not shown).

Figure 2:
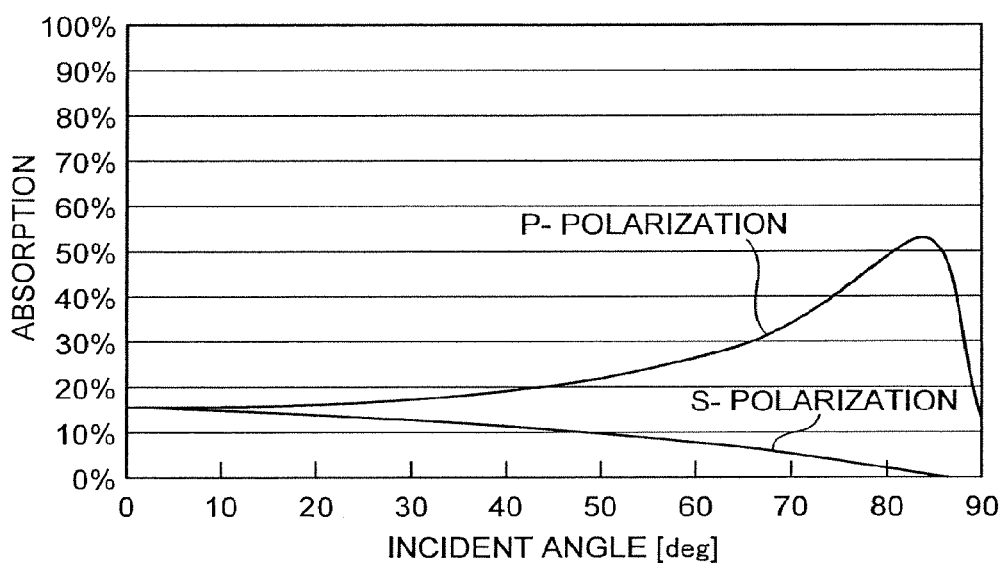
FIG. 2 shows absorption (percentage of incoming laser beam energy that is absorbed) of p-polarized and s-polarized components of a laser beam by a metal Sn.

Absorption of a laser beam by the surface of the droplet D may depend on the polarization state of the laser beam and the incident angle thereof. This will be described in detail below with reference to the drawing. FIG. 2 shows the absorption of p-polarized and s-polarized components of a laser beam by a metal Sn. Although the wavelength of the laser beam in the case illustrated in FIG. 2 is 1.06 μm, the tendency does not change largely even with a laser beam of other wavelengths. Referring to FIG. 2, the absorption of the p-polarized component of the laser beam by the metal Sn may increase as the incident angle increases from 0° until it exceeds approximately 80°, and the absorption may suddenly drop as the incident angle exceeds approximately 85°. On the other hand, the absorption of the s-polarized component of the laser beam by the metal Sn may be substantially at the same level as the absorption of the p-polarized component of the laser beam when the incident angle is around 0°, but the absorption of the s-polarized component may gradually decrease as the incident angle comes closer to 90°.

Thus, the metal Sn may tend to absorb the p-polarized component of the laser beam more at a surface thereof where the incident angle of the laser beam is larger; whereas, it may tend not to absorb the s-polarized component of the laser beam at a surface thereof where the incident angle is larger. This relationship will be considered below, applying to a combination of the spherical droplet D and the focused pre-pulse laser beam L1 of which the beam profile is substantially circular. Here, the assumption may be the diameter of the beam profile of the focused pre-pulse laser beam L1 is substantially the same as the diameter of the droplet D, the irradiation axis passes through the center of the droplet D, and the pre-pulse laser beam L1 is substantially a collimated beam. In such case, the surface region of the droplet D to be irradiated with the leaser beam is substantially a hemispherical region. At the center portion of the substantially hemispherical region, the pre-pulse laser beam L1 may be incident substantially perpendicularly (0°) thereto; thus, both the p-polarized component and the s-polarized of the pre-pulse laser beam L1 may be absorbed at substantially the same level. Meanwhile, the incident angle of the pre-pulse laser beam L1 may come closer to 90° as the distance from the center portion of the hemispherical region increases. For better understanding, the pre-pulse laser beam L1 being seen as a sun beam, the droplet D can be considered as the earth at equinox. When the pre-pulse laser beam L1 is polarized such that it is incident on the droplet D as mostly the s-polarized component, the laser beam is incident at a large angle with respect to the earth's surface near the polar region; thus, the absorption of the pre-pulse laser beam L1 around the polar region is extremely low. On the other hand, in a region near the equator which is under the morning or evening sunlight, an apparently p-polarized component of the laser beam is incident at a large angle with respect to the earth's surface; thus, the laser beam is absorbed with relatively high absorption. As a result, the laser beam is absorbed with differing absorption around the polar region and around the equator at dawn or dusk. Here, the case where a radially polarized pre-pulse laser beam L1 is incident on a surface of a sphere will be discussed. In this case, using the analogy of the earth, the p-polarized component of the laser beam can be incident at a large angle both around the polar region and the equator at dawn or dusk. On the contrary, when an azimuthally polarized pre-pulse laser beam L1 is incident on the droplet D, the s-polarized component of the laser beam can be incident at a large angle both around the polar region and the equator at dawn or dusk. As a result, the energy of the pre-pulse laser beam L1 may be absorbed around the center of the droplet D but reflected as the distance from the center increases. As described above, controlling the polarization state of the pre-pulse laser beam L1 allows makes it possible ti control the absorption of the pre-pulse laser beam L1 by the surface of the droplet D. This means that it is possible to control the distribution of heat input of the pre-pulse laser beam L1 on the surface of the droplet D. As the heat input state changes, the state of the diffused target may change in accordance therewith. That is, controlling the polarization state of the pre-pulse laser beam L1 makes it possible to control the state of the diffused target.

In the first embodiment, the pre-pulse laser beam L1 with which the droplet D is irradiated is radially polarized. With this, the pre-pulse laser beam L1 may be incident on substantially the entire surface of the hemispheric droplet D as the p-polarized component. Accordingly, compared to a case where the droplet D is irradiated with a randomly polarized pre-pulse laser beam L1 or a linearly polarized pre-pulse laser beam L1, the absorption of laser energy at the surface of the droplet D increases, whereby the droplet D can absorb relatively high energy. In other words, when the pre-pulse laser beam L1 is radially polarized, compared to a case where it is in another polarization state, a desired effect can be achieved with lower laser energy.

Figure 3:
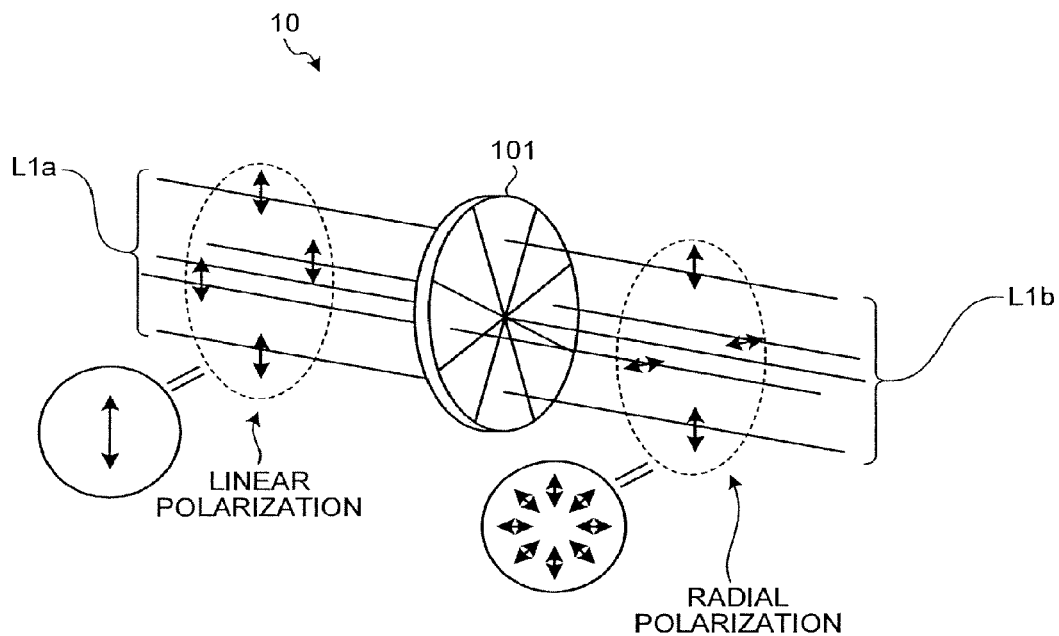
FIG. 3 schematically illustrates a configuration of a polarization control mechanism in accordance with the first embodiment.
Figure 4:
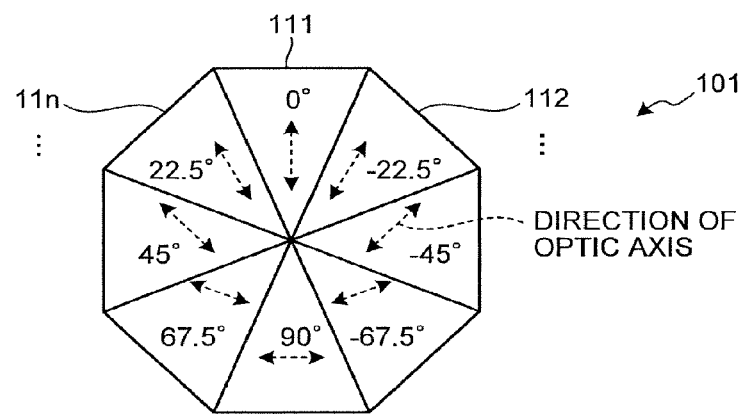
FIG. 4 describes polarization control using the polarization control mechanism illustrated in FIG. 3.

Next, an example of a polarization control mechanism in accordance with the first embodiment will be described with reference to the drawings. FIG. 3 schematically illustrates the configuration of the polarization control mechanism in accordance with the first embodiment. FIG. 4 is a drawing for describing the principle of the polarization control by the polarization control mechanism illustrated in FIG. 3. Note that a case where the pre-pulse laser PL outputs a linearly polarized pre-pulse laser beam L1a will be described as an example in the first embodiment.

Polarization Control Mechanism

As illustrated in FIG. 3, a polarization control mechanism 10 may be an n-divided wave plate 101 having an n-gonal principal surface (octagonal in this example). The n-divided wave plate 101 may be configured of a plurality of plate-shaped twisted nematic (TN) cells 111 through 11n, each cell being an isosceles triangle. The n-divided wave plate 101 may be formed in a plate-shape by arranging the TN cells 111 through 11n such that vertices of the isosceles triangles are gathered. Thus, an interior angle of a vertex of each of the TN cells 111 through 11n is an angle (45° in this example) equal to 360° divided by the number of the TN cells 111 through 11n (eight in this example). The orientation of optical axis of each of the TN cells 111 through 11n, each serving as a wave plate, differs by a predetermined angle from an adjacent TN cell 111 through 11n. The predetermined angle may be given as an angle (22.5° in this example) equal to 180° divided by the number of TN cells 111 through 11n. The polarization direction of a laser beam having passed through each TN cell 111 through 11n may be converted in accordance with an angle between the optical axis of each TN cell 111 through 11n and the direction of linear polarization. With this, the polarization direction of the laser beam having passed through each TN cell 111 through 11n may be converted into a predetermined polarization direction at each portion of the cross section. Accordingly, using such n-divided wave plate 101 as the polarization control mechanism 10 makes it possible to convert the linearly polarized pre-pulse laser beam L1a into a radially polarized pre-pulse laser beam L1b. In this example, a case where a linearly polarized laser beam is converted into a radially polarized laser beam has been shown; however, by appropriately arranging TN cells each having an optical axis in a predetermined orientation, a laser beam passing therethrough may be converted into an azimuthally polarized laser beam.

Modification of Polarization Control Mechanism

Figure 5:
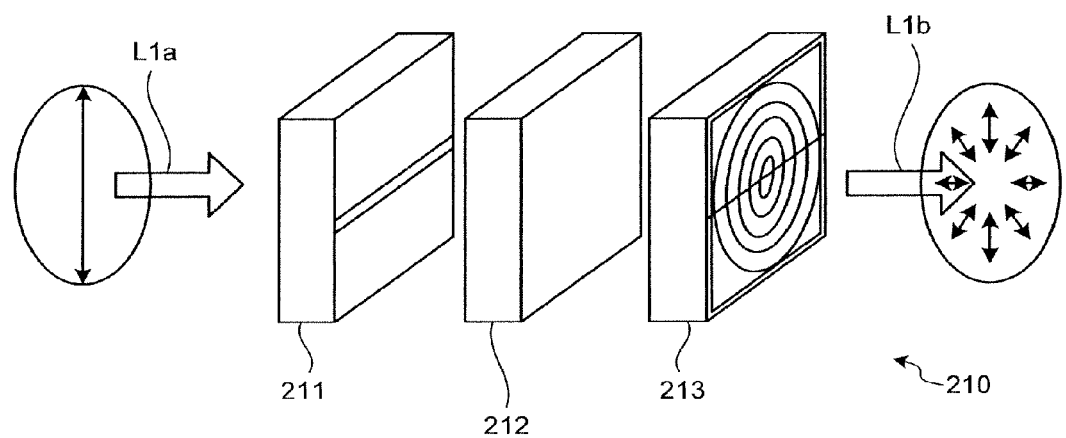
FIG. 5 schematically illustrates a configuration of a polarization control mechanism in accordance with a modification of the first embodiment.

The polarization control mechanism 10 in accordance with the first embodiment may be replaced by a polarization control mechanism 210 illustrated in FIG. 5. FIG. 5 schematically illustrates the configuration of the polarization control mechanism in accordance with a modification of the first embodiment. As illustrated in FIG. 5, the polarization control mechanism 210 in accordance with the modification may include a phase compensation plate 211, a polarization rotation plate 212, and a theta cell 213. The phase compensation plate 211 may, for example, shift the phase of the pre-pulse laser beam L1a passing through the upper half of the transmissive optical surface thereof by 90°. The bottom half of the phase compensation plate 211 may transmit the pre-pulse laser beam L1a without causing the phase thereof to be shifted. The polarization rotation plate 212 may shift the phase of the pre-pulse laser beam L1a incident thereon by 90°. The theta cell 213 may be configured to rotate molecular orientation of a liquid crystal inside a cell along a traveling direction of the incident beam, and is an element configured to rotate a polarization axis of the incident beam, as in the molecular orientation. Accordingly, the linearly polarized pre-pulse laser beam L1a having passed through the phase compensation plate 211 and the polarization rotation plate 212 may be subjected to optical rotation effect when passing through the theta cell 213, thereby being converted into the radially polarized pre-pulse laser beam L1b. Note that the order of the phase compensation plate 211 and the polarization rotation plate 212 may be interchangeable. Further, with the polarization control mechanism 210 in accordance with the modification, the linearly polarized pre-pulse laser beam L1a can be converted into an azimuthally polarized pre-pulse laser beam.

Figure 6:
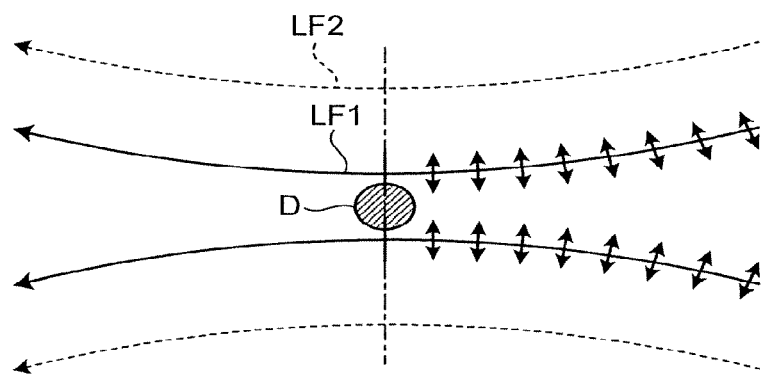
FIG. 6 schematically illustrates a droplet viewed in a direction perpendicular to a beam axis of a pre-pulse laser beam, in plasma generation process in accordance with the first embodiment.
Figure 7:
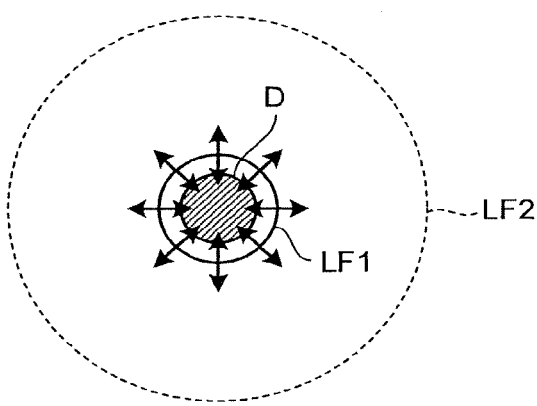
FIG. 7 schematically illustrates the droplet viewed in a direction of the beam axis of the pre-pulse laser beam, in the plasma generation process in accordance with the first embodiment.
Figure 8:
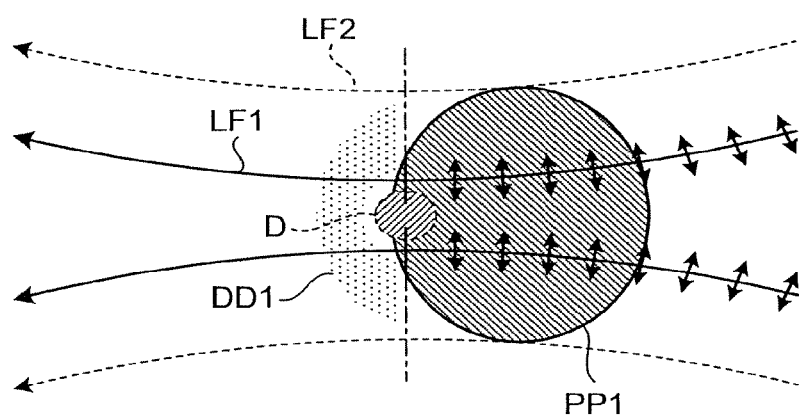
FIG. 8 schematically illustrates fragments and pre-plasma viewed in the direction perpendicular to the beam axis of the pre-pulse laser beam, in the plasma generation process in accordance with the first embodiment.
Figure 9:
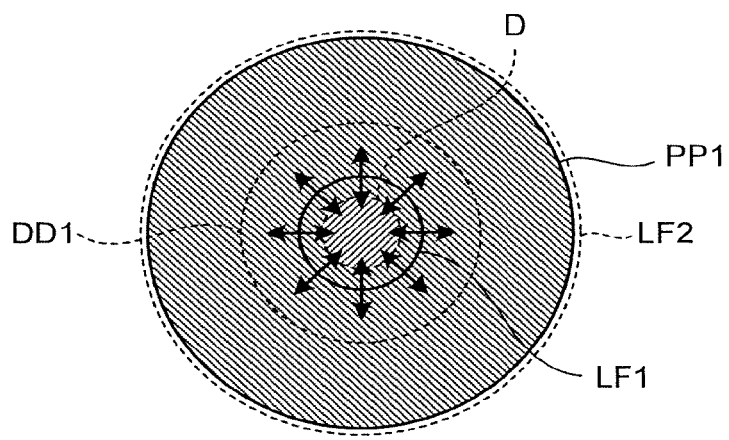
FIG. 9 schematically illustrates the fragments and the pre-plasma viewed in the direction of the beam axis of the pre-pulse laser beam, in the plasma generation process in accordance with the first embodiment.
Figure 10:
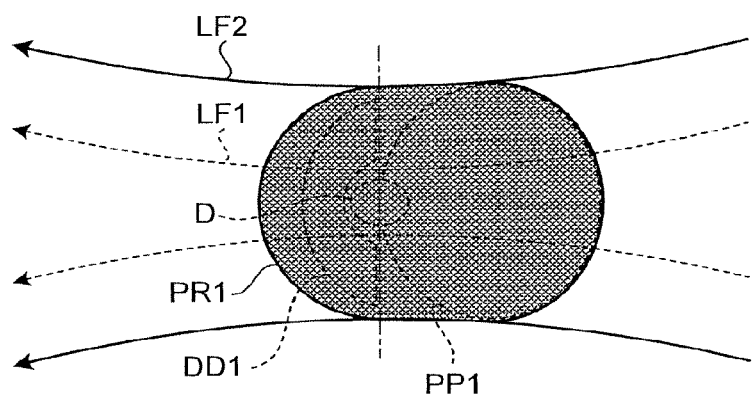
FIG. 10 schematically illustrates the fragments, the pre-plasma, and plasma viewed in the direction of the beam axis of the pre-pulse laser beam, in the plasma generation process in accordance with the first embodiment.
Figure 11:
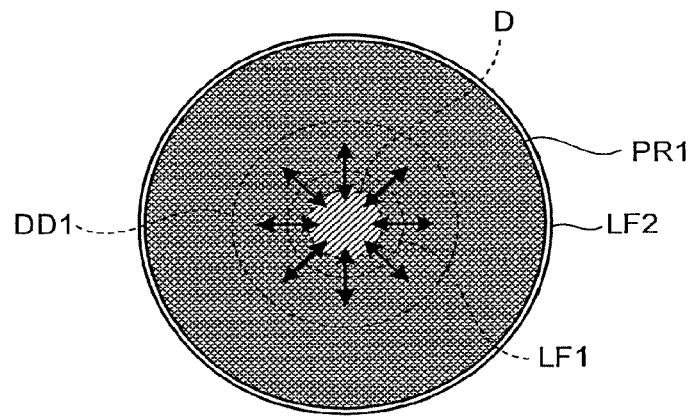
FIG. 11 schematically illustrates the fragments and the plasma viewed in the direction of the beam axis of the pre-pulse laser beam, in the plasma generation process in accordance with the first embodiment.

Next, plasma generation process in accordance with the first embodiment will be described in detail with reference to the drawings. FIGS. 6 through 11 illustrate the plasma generation process in accordance with the first embodiment. FIGS. 6, 8, and 10 schematically illustrate a droplet D, pre-plasma PP1, fragments DD1, and/or plasma PR1 viewed in a direction perpendicular to the beam axis of the pre-pulse laser beam L1 respectively at each stage. FIGS. 7, 9, and 11 schematically illustrate the droplet D, the pre-plasma PP1, the fragments DD1, and/or the plasma PR1 viewed in the direction of the beam axis of the pre-pulse laser beam L1 respectively at each stage of the plasma generation process.

As shown FIG. 6, the droplet D is irradiated with a focused beam in which the pre-pulse laser beam L1 is focused (hereinafter referred to as pre-pulse focused laser beam LF1). Here, the pre-pulse focused laser beam LF1 is the pre-pulse laser beam L1 that has been reflected by the off-axis paraboloidal mirror M2. A polarization state of a laser beam reflected by the off-axis paraboloidal mirror M2 does not change. Accordingly, the polarization state of the pre-pulse focused laser beam LF1 in the first embodiment is radial as in the case of the pre-pulse laser beam L1b. The spot diameter of the pre-pulse focused laser beam LF1 at the irradiation point (plasma generation region P1) is preferably substantially the same as or larger than the diameter of the droplet D.

When the droplet D is irradiated with the radially polarized pre-pulse focused laser beam LF1, in substantially an entire region on the surface of the droplet D which is irradiated with the laser beam, the laser beam may be incident thereon as the p-polarized component, as illustrated in FIG. 7. As illustrated in FIG. 8, the pre-plasma PP1 may spread to a side of the droplet D which is irradiated with the pre-pulse focused laser beam LF1. At this time, as illustrated in FIG. 9, compared to the case where the droplet D is irradiated with a linearly polarized laser beam or a randomly polarized laser beam, the droplet D can be converted into the pre-plasma PP1 that is a more isotropically diffused sphere as viewed in the direction of the beam axis of the pre-pulse focused laser beam LF1. Note that the rate at which the diameter of the pre-plasma PP1 spreads can be controlled by controlling the energy of the pre-pulse focused laser beam LF1. The energy of the pre-pulse focused laser beam LF1 may be controlled such that the diameter of the pre-plasma PP1 is approximately the same size as the spot diameter of the main pulse focused laser beam LF2 (See FIG. 10) at the irradiation point thereof at predetermined timing (See FIG. 8 or 9). Further, as illustrated in FIG. 8, granular target material scatters (hereinafter referred to as fragment(s) DD1) to a side opposite of the side of the droplet D which is irradiated with the pre-pulse focused laser beam LF1.

Subsequently, at least one of the pre-plasma PP1 and the fragments DD1 into which the droplet D has been transformed by being irradiated with the pre-pulse focused laser beam LF1 may be irradiated with the main pulse focused laser beam LF2. Here, the main pulse focused laser beam LF2 is the main pulse laser beam L2 that has been reflected by the off-axis paraboloidal mirror M2. Further, the main pulse focused laser beam LF2 generally has a circular cross-section. The beam diameter of the main pulse focused laser beam LF2 at the focus position thereof (plasma generation region P1) may be controlled so as to be approximately the same, at predetermined timing, as the diameter of the diffused target or larger than the diameter of the diffused target. In the present embodiment, the main pulse focused laser beam LF2 has a circular cross-section. In addition, the pre-plasma PP1 is an isotropically diffused sphere. Accordingly, the pre-plasma PP1 can be irradiated with the main pulse focused laser beam LF2 with the beam diameter of the main pulse focused laser beam LF2 at the focus position thereof being matched with the diameter of the pre-plasma PP1.

In this way, the droplet D is irradiated with the radially polarized pre-pulse laser beam, whereby the absorption of the pre-pulse laser beam can be increased. Accordingly, the energy required to transform the droplet D into the diffused target can be reduced. The diffused target is irradiated with the main pulse focused laser beam LF2 having substantially the same diameter as the diffused target, whereby laser energy that does not contribute to plasma generation can largely be reduced. As a result, the EUV light can be generated with smaller energy. In other words, energy conversion efficiency (CE) can be improved. Here, the CE can be defined as the ratio of the energy of the emitted EUV light to the energy of the laser beam with which the target material is irradiated.

In the present embodiment, the pre-plasma PP1 is irradiated with the main pulse focused laser beam LF2 at timing when the diameter of the pre-plasma PP1 is at substantially the same as the beam diameter of the main pulse focused laser beam LF2, but without being limited thereto, the fragments DD1 may be irradiated with the main pulse focused laser beam LF2 at timing when the diameter of the range of the distributed fragments DD1 is at substantially the same as the beam diameter of the main pulse focused laser beam LF2.

Pre-Pulse Laser

Figure 12:
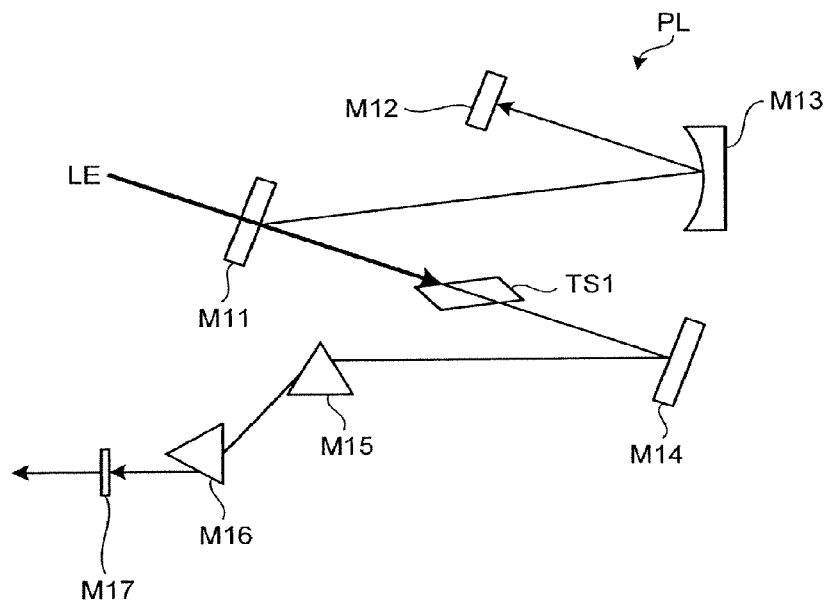
FIG. 12 schematically illustrates an exemplary configuration of a pre-pulse laser in accordance with the first embodiment.

Next, a pre-pulse laser PL in accordance with the first embodiment will be described in detail with reference to the drawing. In the first embodiment, exemplified as the pre-pulse laser PL is a self-mode-locked Ti:sapphire laser which outputs a pulsed laser beam having a pico-second order pulse width, but the pre-pulse laser PL is not limited thereto. FIG. 12 schematically illustrates the configuration of the pre-pulse laser in accordance with the first embodiment. As illustrated in FIG. 12, the pre-pulse laser PL may comprise a resonator configured of a semiconductor saturable absorber mirror M12 and an output coupler M17. Within this resonator, disposed in order from the semiconductor saturable absorber mirror M12 may be a concave high reflective mirror M13 that converges a laser beam incident on the semiconductor saturable absorber mirror M12, a high reflective mirror M11 that transmits a pumping beam LE outputted from, for example, an external pumping source and reflects the laser beam inside the resonator, a Ti:sapphire crystal TS1 that is excited by the pumping beam LE from the external source and oscillates a laser beam, a high reflective mirror M14 that reflects the laser beam inside the resonator, and two prisms M15 and M16 that separate a laser beam of a desired wavelength out of the laser beam outputted from the Ti:sapphire crystal TS1. Note that beam input/output end surfaces of the Ti:sapphire crystal TS1 may be Brewster-cut to suppress reflection of the incident beam. In this configuration, a second-harmonic beam of a laser beam outputted from an external Nd:YVO4 laser, for example, may be introduced as the pumping beam LE via the high reflective mirror M11. Then, the laser beam may be oscillated, having the recovery time of the semiconductor saturable absorber mirror M12 synchronized with the longitudinal mode determined by the distance in which the beam makes a round-trip in the resonator. With this, a pulsed laser beam having a pico-second order pulse width may be outputted from the pre-pulse laser PL. Using such pulsed laser beam having a pico-second order pulse width as the pre-pulse laser beam L1 enables to increase irradiation energy density per unit time, whereby the droplet can be transformed into the diffused target efficiently.

Further, when such pulsed laser beam having a pico-second order pulse width is used as the pre-pulse laser beam L1a and a solid target of Sn, for example, is used as a target, only a surface thereof can be instantaneously heated without destroying the interior of the solid target. In other words, of the entire volume of the target, only a very small surface volume thereof can be turned into pre-plasma. As the pre-plasma is irradiated with the main pulse focused laser beam, generation of debris can be prevented. Note that, depending on the size of the target, pulse energy of the pre-pulse laser beam L1 may be insufficient. If this is the case, the pre-pulse laser beam L1 may be amplified by a regenerative amplifier and then the target may be irradiated therewith.

Modification of Pre-Pulse Laser

Figure 13:
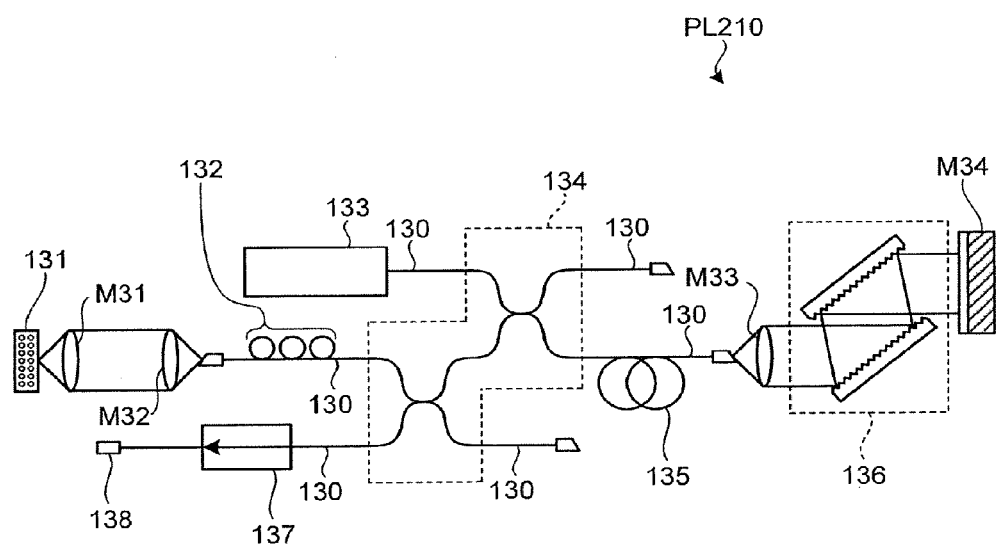
FIG. 13 schematically illustrates an exemplary configuration of a pre-pulse laser in accordance with a modification of the first embodiment.

Further, the pre-pulse laser PL in accordance with the first embodiment can be replaced by a pre-pulse laser PL210 illustrated in FIG. 13. In the modification, a mode-locked Yb-doped fiber laser that outputs a pulsed laser beam having a pico-second order pulse width is exemplified as the pre-pulse laser PL210, but the pre-pulse laser PL210 is not limited thereto. FIG. 13 schematically illustrates the configuration of the pre-pulse laser in accordance with the modification of the first embodiment. As illustrated in FIG. 13, the pre-pulse laser PL210 in accordance with the modification may comprise: a plurality of optical fibers 130 constituting a laser beam path; a combining unit 134 where the plurality of the optical fibers 130 are connected; a semiconductor saturable absorber mirror (SESAM) 131 and an output coupler 138 that are respectively provided at each end of the connected optical fiber and that cooperatively form a resonator; a plurality of lenses M31 and M32 that regulate the beam profile of the laser beam reflected by the semiconductor saturable absorber mirror 131 and input the beam to one end of a branch of the optical fiber 130; a polarization control unit 132 configured to control the polarization state of the laser beam inside the resonator; a beam pump 133 configured to introduce a pumping beam into the resonator at one end of a branch of the optical fiber 130; a Yb-doped fiber 135 provided at a portion of the optical fiber 130 and configured to amplify the pumping laser beam; a collimator lens M33 configured to collimate the laser beam outputted radially from one end of the Yb-doped fiber 135; a grating pair 136 configured to output a collimated laser beam of a selected wavelength; a high reflective mirror M34 marking a turning point of this branch; and an isolator 137 configured to output a laser beam of a target wavelength from the output coupler 138. Using such fiber laser having a pico-order pulse width as the pre-pulse laser PL210 makes it possible to increase irradiation energy density per unit time, whereby the droplet can be transformed into the diffused target efficiently.

When Sn is used as the target material, the shorter the wavelength of the irradiating laser beam, the higher the absorption of the laser beam by the droplet D. For example, when an Nd:YAG laser is used as the pre-pulse laser PL, a second-harmonic ($\lambda 2\omega=532$ nm) beam or a third-harmonic ($\lambda 3\omega=266$ nm) beam, when used as the pre-pulse laser beam L1, may yield higher absorption by the droplet D than a first-harmonic ($\lambda \omega=1064$ nm) beam does.

As described so far, according to the first embodiment, it is possible to control the polarization state of the pre-pulse laser beam L1 for transforming the target material into the diffused target, the CE can be improved.

Second Embodiment

Figure 14:
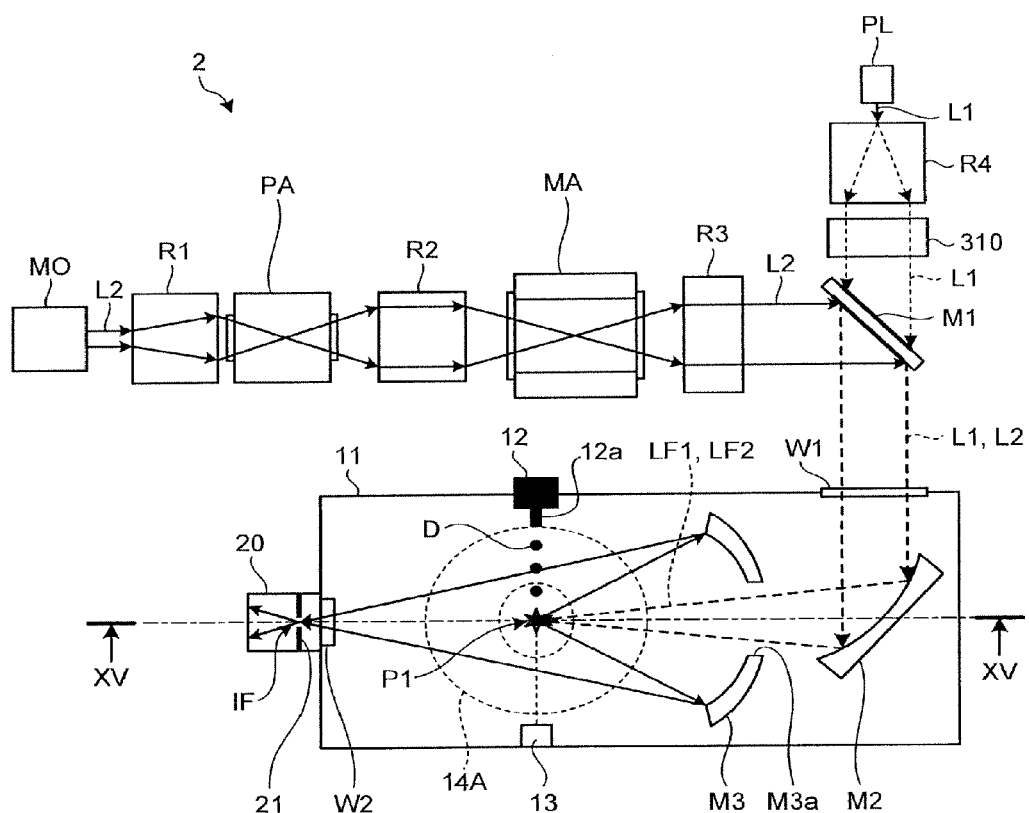
FIG. 14 schematically illustrates a configuration of an EUV light generation system in accordance with a second embodiment of this disclosure.
Figure 15:
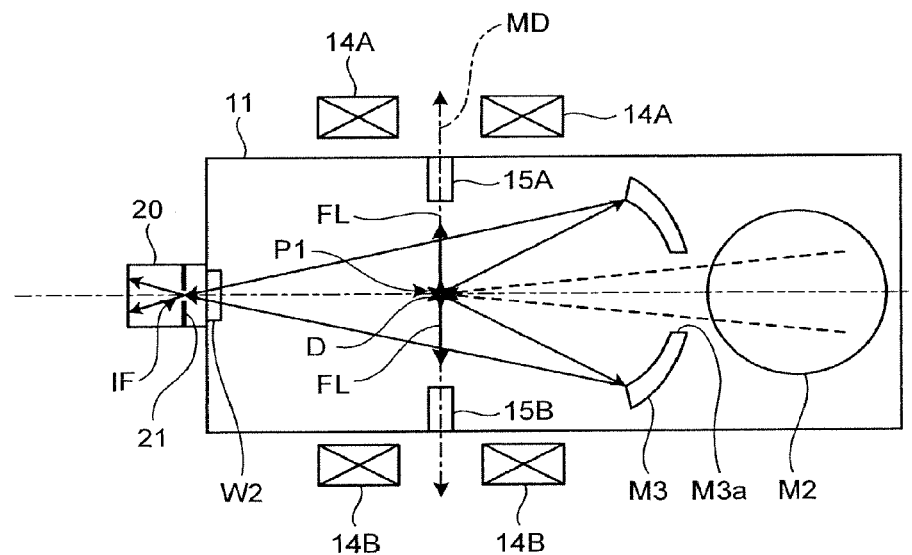
FIG. 15 is a sectional view schematically illustrating the EUV light generation system illustrated in FIG. 14, taken along line XV-XV of FIG. 14.

According to a second embodiment of this disclosure, debris generated when plasma is generated can be collected efficiently by controlling a polarization state of a laser beam. Hereinafter, an EUV light generation system in accordance with the second embodiment of this disclosure will be described in detail with reference to the drawings. In the second embodiment, an adverse effect of debris containing a charged particle that contains an ion generated when plasma is generated will be reduced using a magnetic field. FIG. 14 schematically illustrates the configuration of the EUV light generation system in accordance with the second embodiment. FIG. 15 is a sectional view schematically illustrating the EUV light generation system illustrated in FIG. 14, taken along line XV-XV.

As illustrated in FIG. 14, an EUV light generation system 2 in accordance with the second embodiment may be similar in configuration with the EUV light generation system 1 illustrated in FIG. 1. However, in the second embodiment, the polarization control mechanism 10 is replaced by a polarization control mechanism 310. The polarization control mechanism 310 will be described later in detail.

As illustrated in FIG. 15, the EUV light generation system 2 may comprise coils 14A and 14B and debris collection units 15A and 15B. The coils 14A and 14B may be a pair of coils constituting an electromagnet, and may be disposed outside the chamber 11 such that the center of the magnetic flux of the magnetic field generated by the coils passes through the plasma generation region P1. The debris collection units 15A and 15B may be disposed in the chamber 11, and are preferably disposed on the central axis of the magnetic flux of the magnetic field generated by the coils 14A and 14B. Each of the debris collection units 15A and 15B may be cylindrical with one end thereof opening toward the plasma generation region P1. The debris trapped in the magnetic field generated by the coils 14A and 14B travels along the magnetic flux of the magnetic field, and thereafter may enter the debris collection unit 15A or 15B. This makes it possible to collect the debris containing a charged particle that contains an ion generated at the plasma generation region P1.

When debris generated as plasma is generated is collected, the debris can be collected more efficiently by controlling the state of the plasma. The state of the plasma can be controlled by controlling the state of the diffused target at a preceding stage thereof. Further, the state of the diffused target can be controlled by controlling the polarization state of the pre-pulse laser beam with which the droplet D is irradiated. Hereinafter, a mechanism of controlling the polarization state of the pre-pulse laser beam in accordance with the second embodiment will be described in detail with reference to the drawing.

Figure 16:
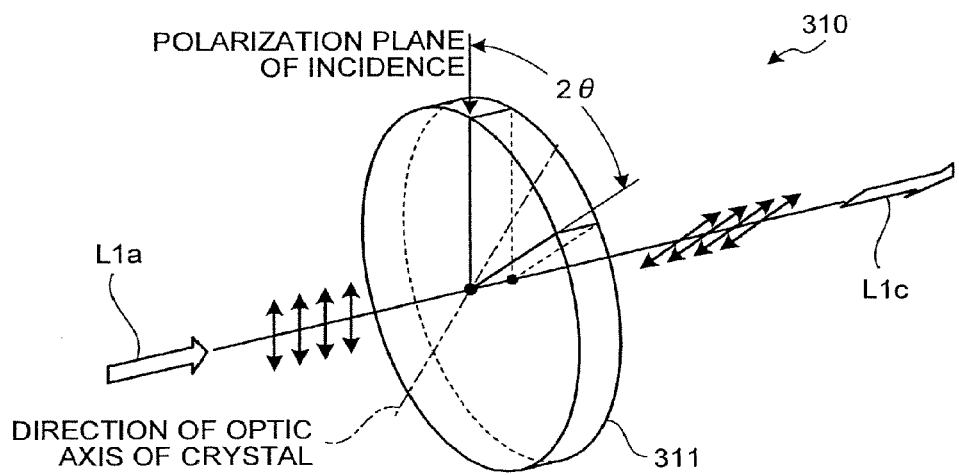
FIG. 16 schematically illustrates an exemplary configuration of a polarization control mechanism in accordance with the second embodiment.

FIG. 16 schematically illustrates the configuration of a polarization control mechanism in accordance with the second embodiment. As illustrated in FIG. 16, the polarization control mechanism 310 may include a half wave plate 311 which causes the polarization direction of the linearly polarized pre-pulse laser beam L1a incident thereon to be rotated by a predetermined degree. The half wave plate 311 may be a crystal such as a cadmium sulfide single crystal or the like, for example. The half wave plate 311 is preferably disposed so that the polarization direction of a rotated pre-pulse laser beam L1c coincides with the direction of the magnetic field (MD) generated by the coils 14A and 14B. Here, when θ is defined as an angle between the direction of the optic axis of the crystal and the polarization direction of the linearly polarized pre-pulse laser beam, the pre-pulse laser beam L1a, having passed through the half wave plate 311, may be converted into a linearly polarized laser beam with the polarization direction thereof being rotated by 2θ. Accordingly, rotating the half wave plate 311 makes it possible to regulate the polarization direction of the pre-pulse laser beam L1c so that it coincides with the direction of the magnetic field.

Figure 17:
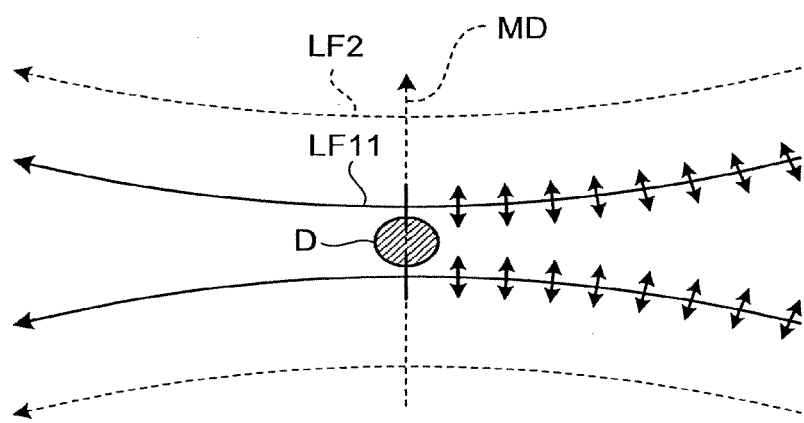
FIG. 17 schematically illustrates a droplet viewed in a direction perpendicular to a beam axis of a pre-pulse beam, in plasma generation process in accordance with the second embodiment.
Figure 18:
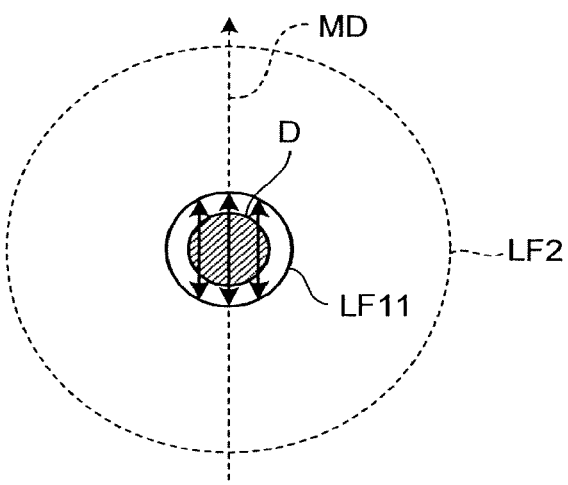
FIG. 18 schematically illustrates the droplet viewed in the direction of the beam axis of the pre-pulse laser beam, in the plasma generation process in accordance with the second embodiment.
Figure 19:
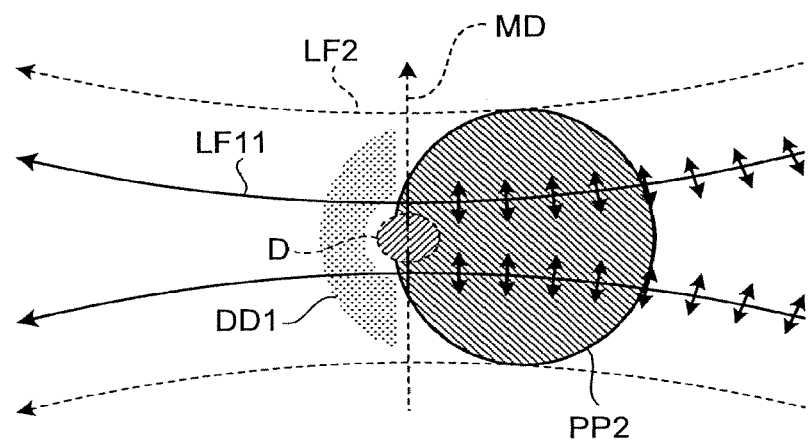
FIG. 19 schematically illustrates fragments and pre-plasma viewed in the direction perpendicular to the beam axis of the pre-pulse laser beam, in the plasma generation process in accordance with the second embodiment.
Figure 20:
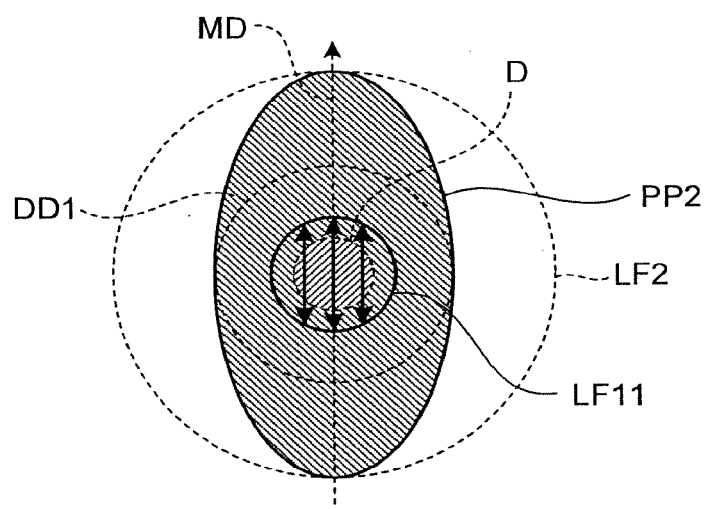
FIG. 20 schematically illustrates the fragments and the pre-plasma viewed in the direction of the beam axis of the pre-pulse laser beam, in the plasma generation process in accordance with the second embodiment.
Figure 21:
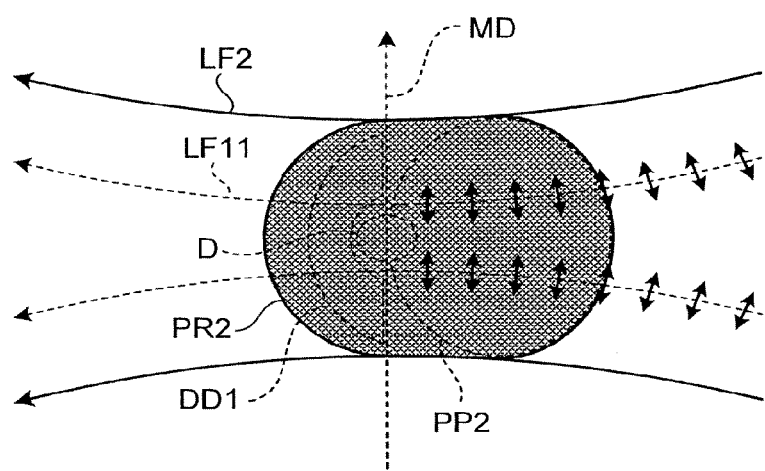
FIG. 21 schematically illustrates the fragments, the pre-plasma, and plasma viewed in the direction perpendicular to the beam axis of the pre-pulse laser beam, in the plasma generation process in accordance with the second embodiment.
Figure 22:
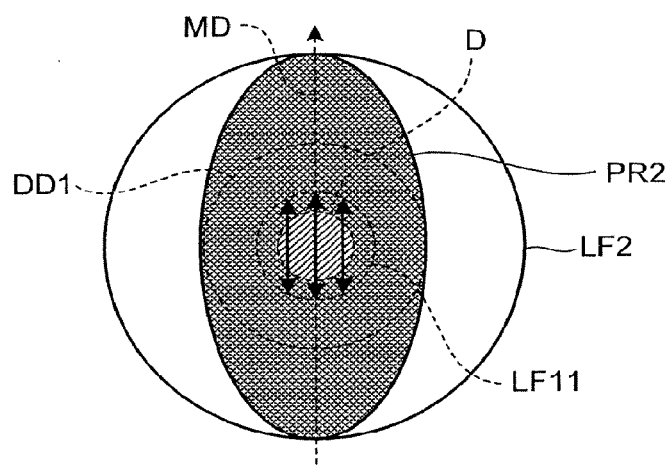
FIG. 22 schematically illustrates the fragments, the pre-plasma, and the plasma viewed in the direction of the beam axis of the pre-pulse laser beam, in the plasma generation process in accordance with the second embodiment.

Here, plasma generation process in accordance with the second embodiment will be described in detail with reference to the drawings. FIGS. 17 through 22 schematically illustrate the plasma generation process in accordance with the second embodiment. FIGS. 17, 19, and 21 schematically illustrate the droplet D, pre-plasma PP2, and plasma PR2 viewed in a direction perpendicular to the beam axis of the pre-pulse laser beam L11 respectively at each stage. FIGS. 18, 20, and 22 schematically illustrate the droplet D, the pre-plasma PP2, and the plasma PR2 viewed in the direction of the beam axis of the pre-pulse laser beam L11 respectively at each stage.

First, as illustrated in FIG. 17, the droplet D is irradiated with a pre-pulse focused laser beam LF11 in which the pre-pulse laser beam L11 is focused. The pre-pulse focused laser beam LF11 is linear polarized. The case where the droplet D is irradiated with the linearly polarized pre-pulse focused laser beam LF11 will be described. As illustrated in FIG. 18, a large portion of the pre-pulse focused laser beam LF11 is incident on end surfaces in the direction MD of the magnetic field as the p-polarized component thereof, of the region of the droplet D which has been irradiated with the pre-pulse focused laser beam LF11; therefore, the absorption of the laser beam is relatively high. On the other hand, a large portion of the pre-pulse focused laser beam LF11 is incident on end surfaces in the direction perpendicular to the direction MD of the magnetic field as the s-polarized component, of the irradiated region; therefore, the absorption of the laser beam is relatively low. At a region where the absorption of the laser beam is high, heat input to the target material is relatively large; thus, plasma with relatively high temperature may be generated. Meanwhile, at a region where the absorption of the laser beam is low, heat input to the target material is relatively small; thus, plasma with relatively low temperature may be generated. The plasma with high temperature has higher diffusion rate than the plasma with low temperature. As a result, the pre-plasma PP2 generated from the droplet D may be formed into a shape elongated in the direction MD of the magnetic field, as illustrated in FIGS. 19 and 20. When the elongated pre-plasma PP2 is irradiated with the main pulse focused laser beam LF2 in which the main pulse laser beam L2 is focused, as illustrated in FIGS. 21 and 22, the plasma PR2 elongated in the direction MD of the magnetic field may be generated. Debris emitted when such elongated plasma PR2 is generated has a velocity vector in the direction MD of the magnetic field. The debris having the velocity vector in the direction MD of the magnetic field is trapped in the magnetic field more reliably. As a result, the collection rate of the debris is expected to rise. Note that the fragments DD1 are not affected by the magnetic field at this point since they are electrically neutral. Further, when the fragments DD1 are irradiated with the main pulse laser beam, plasma is generated and is formed into a shape elongated in the direction MD of the magnetic field by the magnetic field.

The above-described configuration may make it possible to efficiently collect the debris generated when plasma is generated.

Third Embodiment

Next, an EUV light generation system in accordance with a third embodiment of this disclosure will be described in detail. The EUV light generation system in accordance with the third embodiment may be similar in configuration to the EUV light generation system of the first embodiment, and a mass-limited droplet is used as the droplet D. The mass-limited droplet is constituted by the smallest required number of atoms for yielding desired EUV light output when almost all of the atoms constituting the droplet are excited to generate the EUV light. When the target is excited by a laser having an output of 10 kW and a repetition rate of 100 kHz and when the desired EUV light output is 100 W, the diameter of the mass-limited droplet can be estimated at approximately 10 µm.

Figure 23:
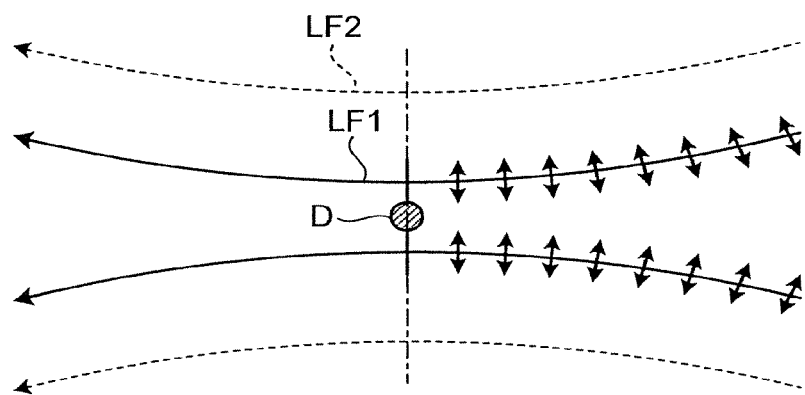
FIG. 23 schematically illustrates a droplet viewed in a direction perpendicular to a beam axis of a pre-pulse laser beam, in plasma generation process in accordance with a third embodiment of this disclosure.
Figure 24:
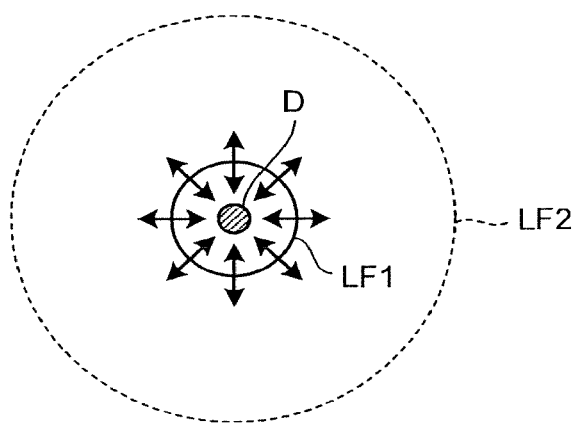
FIG. 24 schematically illustrates the droplet viewed in the direction of the beam axis of the pre-pulse laser beam, in the plasma generation process in accordance with the third embodiment.
Figure 25:
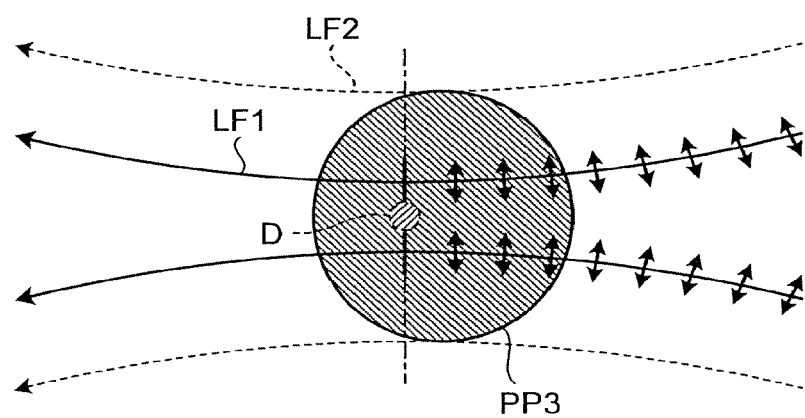
FIG. 25 schematically illustrates pre-plasma viewed in the direction perpendicular to the beam axis of the pre-pulse laser beam, in the plasma generation process in accordance with the third embodiment.
Figure 26:
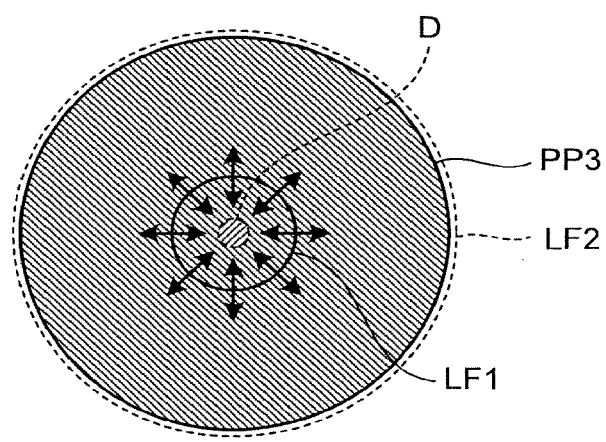
FIG. 26 schematically illustrates the pre-plasma viewed in the direction of the beam axis of the pre-pulse laser beam, in the plasma generation process in accordance with the third embodiment.
Figure 27:
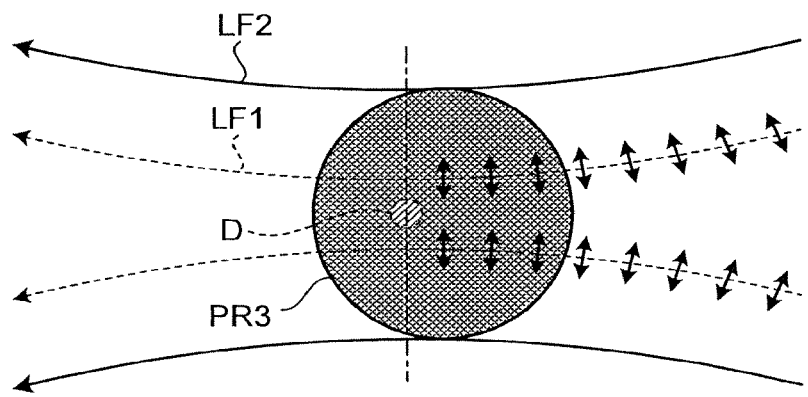
FIG. 27 schematically illustrates plasma viewed in the direction perpendicular to the beam axis of the pre-pulse laser beam, in the plasma generation process in accordance with the third embodiment.
Figure 28:
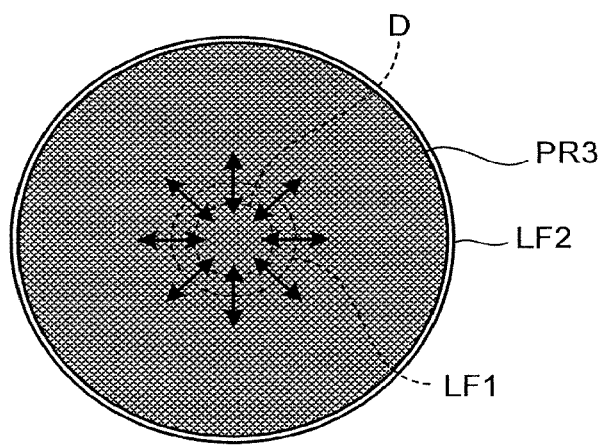
FIG. 28 schematically illustrates the plasma viewed in the direction of the beam axis of the pre-pulse laser beam, in the plasma generation process in accordance with the third embodiment.

The plasma generation process in accordance with the third embodiment will be described in detail with reference to the drawings. FIGS. 23 through 28 shows the plasma generation process in accordance with the third embodiment. FIGS. 23, 25, and 27 schematically illustrate the droplet D, a diffused target PP3, and plasma PR3 viewed in a direction perpendicular to the beam axis of the pre-pulse laser beam L1 respectively at each stage. FIGS. 24, 26, and 28 schematically illustrate the droplet D, the diffused target PP3, and the plasma PR3 viewed in the direction of the beam axis of the pre-pulse laser beam L1 respectively at each stage.

As illustrated in FIG. 23, first, the droplet D is irradiated with the pre-pulse focused laser beam LF1 in which the pre-pulse laser beam L1 is focused. The pre-pulse focused laser beam LF1 may be radially polarized. When the droplet D is irradiated with the radially polarized pre-pulse focused laser beam LF1, as illustrated in FIG. 24, the pre-pulse focused laser beam LF1 may be incident on the irradiation surface of the spherical droplet D mainly as the p-polarized component. Accordingly, the droplet D may diffuse isotropically and transformed into a diffused target PP3 having isotropic distribution. When such diffused target PP3 is irradiated with a main pulse focused laser beam LF2 having a circular beam profile, as illustrated in FIGS. 25 through 28, the entirety of the diffused target PP3 can be heated, whereby plasma PR3 having high temperature can be generated. As a result, almost all the atoms of the droplet D can be excited to generate the EUV light L3.

The above-described configuration makes it possible to excite the droplet D efficiently and to prevent the debris from being generated.

Fourth Embodiment

Figure 29:
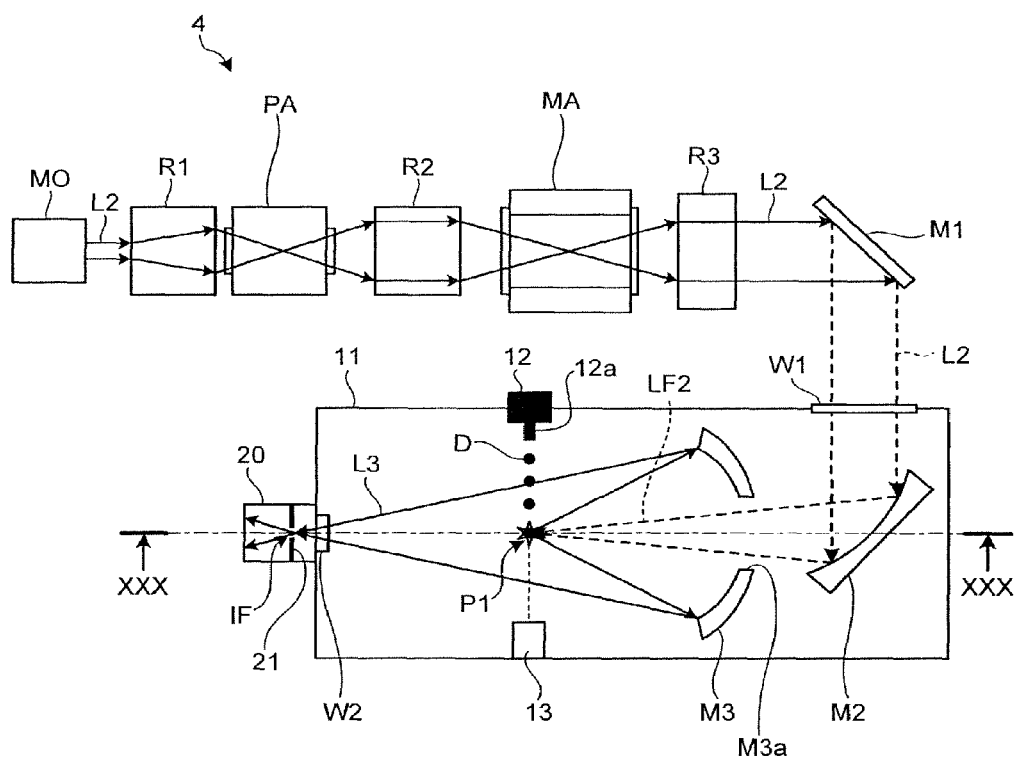
FIG. 29 schematically illustrates a configuration of an EUV light generation system in accordance with a fourth embodiment of this disclosure.
Figure 30:
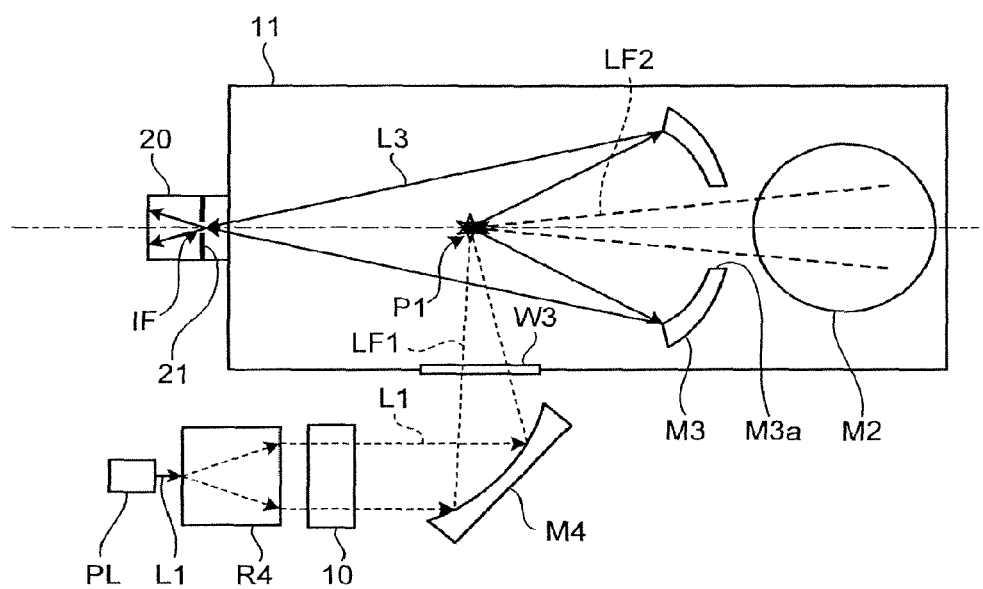
FIG. 30 is a section view schematically illustrating the EUV light generation system illustrated in FIG. 29, taken along line XXX-XXX of FIG. 29.

Next, an EUV light generation system in accordance with a fourth embodiment of this disclosure will be described in detail with reference to the drawings. In the fourth embodiment, the pre-pulse laser beam L1 may be focused on the droplet D in a direction different from the direction the main pulse laser beam L2 is focused thereon. FIG. 29 schematically illustrates the configuration of an EUV light generation system 4 in accordance with the fourth embodiment. FIG. 30 is a sectional view schematically illustrating the EUV light generation 4 illustrated in FIG. 9, taken along line XXX-XXX.

As illustrated in FIG. 29, the EUV light generation system 4 in accordance with the fourth embodiment may be similar in configuration to the EUV light generation system 1 illustrated in FIG. 1. In the fourth embodiment, however, only the main pulse laser beam L2 is introduced into the chamber 11 via the window W1. Therefore, the laser beam introduction mirror M1 can be replaced by a high reflective mirror.

As illustrated in FIG. 30, in the EUV light generation system 4, the pre-pulse laser beam L1 may be reflected by an off-axis paraboloidal mirror M4 that is different from the off-axis paraboloidal mirror for the main pulse laser beam L2, and focused in the plasma generation region P1 inside the chamber 11 via a separate window W3.

In this way, even when the pre-pulse laser beam L1 and the main pulse laser beam L2 are focused on the droplet D respectively in different directions, by controlling the polarization state of the pre-pulse laser beam L1 using the above-described polarization control mechanism 10 or 210, or the like, similar effect as in the above-described first or third embodiment can be obtained.

Fifth Embodiment

Next, an EUV light generation system in accordance with a fifth embodiment of this disclosure will be described in detail with reference to the drawings. In the above-described embodiments, the polarization control mechanism 10, 210, or 310 for controlling the polarization state of the pre-pulse laser beam L1 has been disposed on a beam path between the pre-pulse laser PL or PL210 and the plasma generation region P1. In the fifth embodiment, however, a polarization control mechanism may be integrally provided to a pre-pulse laser.

Figure 31:
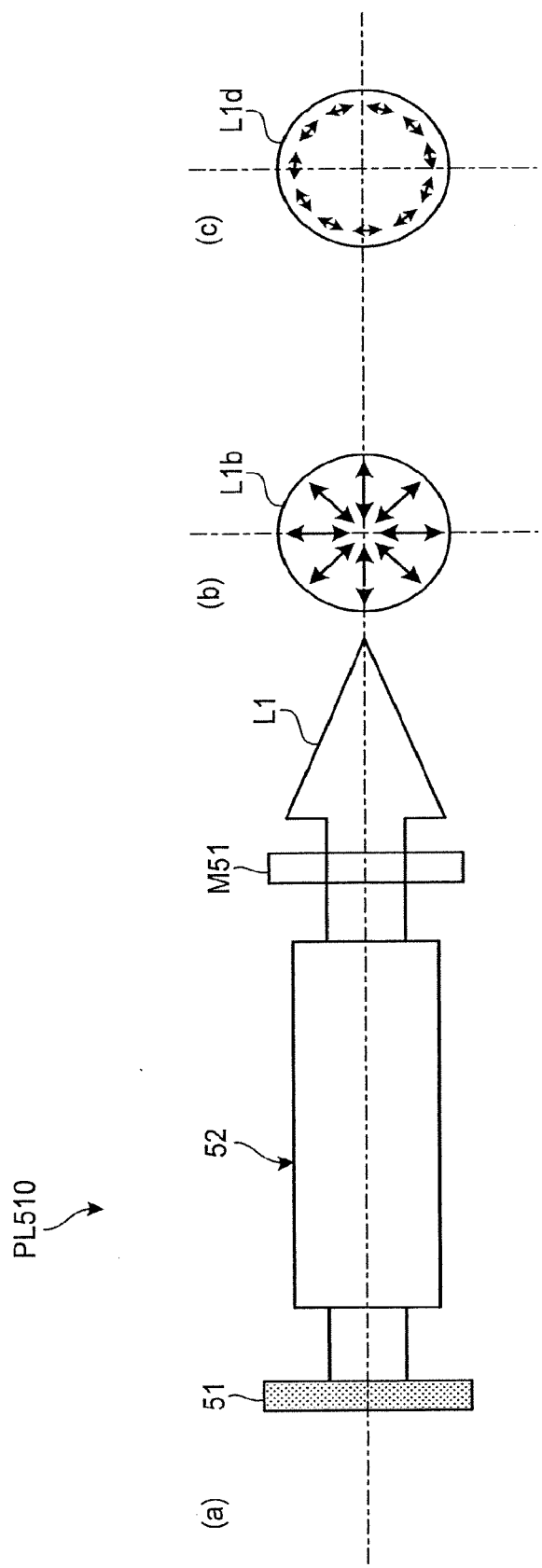
FIG. 31 schematically illustrates an exemplary configuration of a pre-pulse laser in accordance with a fifth embodiment of this disclosure.

FIG. 31 schematically illustrates the configuration of a pre-pulse laser in accordance with the fifth embodiment. As illustrated in FIG. 31, for a pre-pulse laser PL510 in accordance with the fifth embodiment, of two mirrors constituting a resonator, a reflective-type polarization control element 51 may be used for a rear mirror (See (a) in FIG. 31). By appropriately selecting the polarization control element 51, the pre-pulse laser PL510 may be configured to output a radially polarized pre-pulse laser beam L1b (See (b) in FIG. 31) or to output an azimuthally polarized pre-pulse laser beam L1d (See (c) in FIG. 31). For a front mirror, a front mirror M51, which is an output coupler, for example, may be used. Between the polarization control element 51 and the front mirror M51, a chamber containing a laser medium 52 may be disposed.

Polarization Control Element

Figure 32:
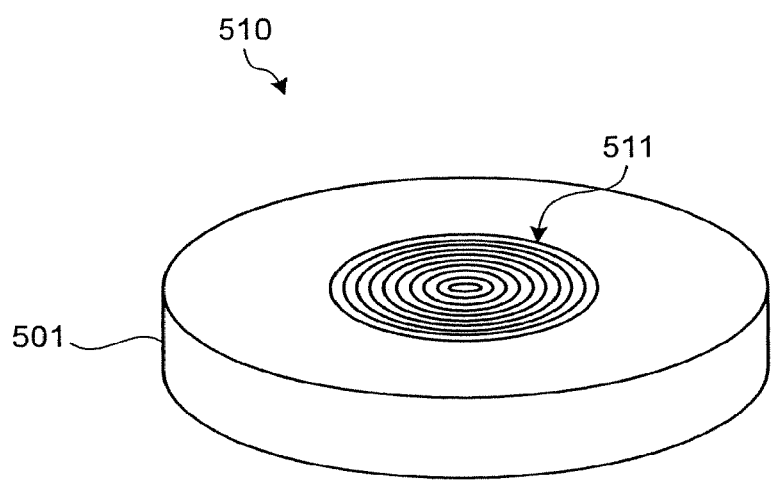
FIG. 32 is a perspective view illustrating an example of a polarization control element used in the pre-pulse laser illustrated in FIG. 31.
Figure 33:
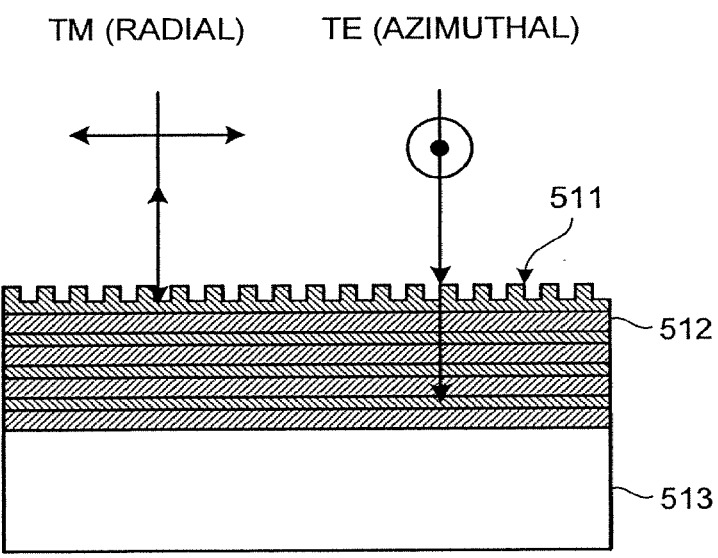
FIG. 33 is an exploded, fragmentary longitudinal sectional view of the polarization control element illustrated in FIG. 32.

One example of the polarization control element 51 will be described in detail with reference to the drawing. In this description, the polarization control element 51 used to generate the radially polarized pre-pulse laser beam L1b will be shown as an example. FIG. 32 is a perspective view illustrating one example of the polarization control element illustrated in FIG. 31. FIG. 33 is an enlarged fragmentary longitudinal section of the polarization control element illustrated in FIG. 32. As illustrated in FIG. 32, for the polarization control element 51 in accordance with the fifth embodiment, a so-called circular grating mirror 510 in which a grating 511 is formed on a reflective surface of a high-reflective mirror 501 concentrically may be used. Further, as illustrated in FIG. 33, in the high-reflective mirror 501, a multilayer film 512 may be formed on a reflective surface of a glass substrate 513. On the top-most layer of the multilayer film 512, the grating 511 may be formed concentrically. Such circular grating mirror 510 having the concentric grating 511 being formed therein may transmit an azimuthally polarized laser beam and reflect a radially polarized laser beam of the laser beam oscillated by the laser medium 52. Accordingly, when the circular grating mirror 510 is used as the rear mirror of the laser resonator, only the radially polarized laser beam may be amplified inside the resonator. That is, the pre-pulse laser beam L1 outputted from the pre-pulse laser PL510 will be the radially polarized pre-pulse laser beam L1b.

Modification of Polarization Control Element

Figure 34:
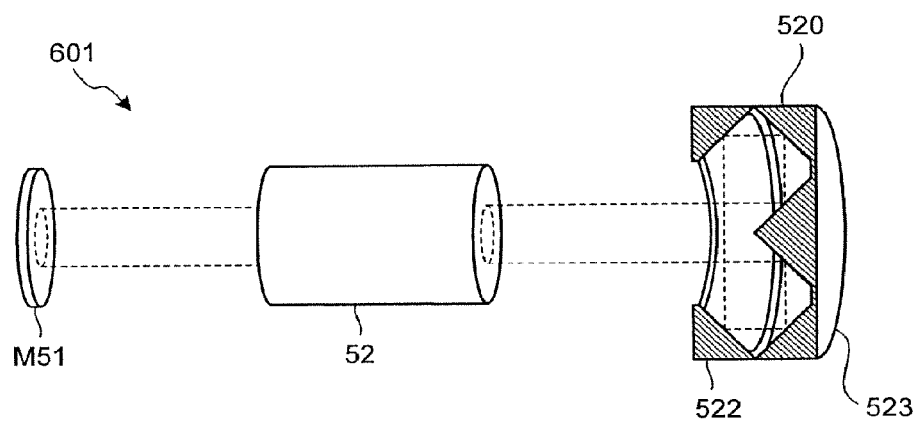
FIG. 34 schematically illustrates a configuration of a polarization control element in accordance with a modification of the fifth embodiment.

In addition, for the polarization control element 51 illustrated in FIG. 31, a rear mirror unit 520 illustrated in FIG. 34 may also be used. FIG. 34 schematically illustrates the configuration of a polarization control element in accordance with a modification of the fifth embodiment. As illustrated in FIG. 34, the rear mirror unit 520 may be configured by coaxially combining an axicon mirror 522 and a w-axicon mirror 523, which cooperatively may function as a retroreflector. That is, the rear mirror unit 520 may comprise a configuration of a so-called triple axicon unit. Each reflective surface of the axicon mirror 522 and of the w-axicon mirror 523 is preferably inclined 45° with respect to a beam axis of a laser beam which is amplified by the laser medium 52. Further, each reflective surface is preferably coated with a dielectric multilayer film. Controlling reflectivity of a laser beam incident as the p-polarized component on the dielectric multilayer film and as the s-polarized component thereon enables a laser beam either with radial polarization or azimuthal polarization to be outputted. For example, making the reflectivity of the p-polarized component of a laser beam incident on the dielectric multilayer film higher than the reflectivity of the s-polarized component of the laser beam incident on the dielectric multilayer film enables the radially polarized pre-pulse laser beam L1b to be generated. On the other hand, making the reflectivity of the p-polarized component of a laser beam incident on the dielectric multilayer film higher than the reflectivity of the s-polarized component of the laser beam incident on the dielectric multilayer film enables the azimuthally polarized pre-pulse laser beam Lid to be generated.

Modification of Pre-Pulse Laser

Figure 35:
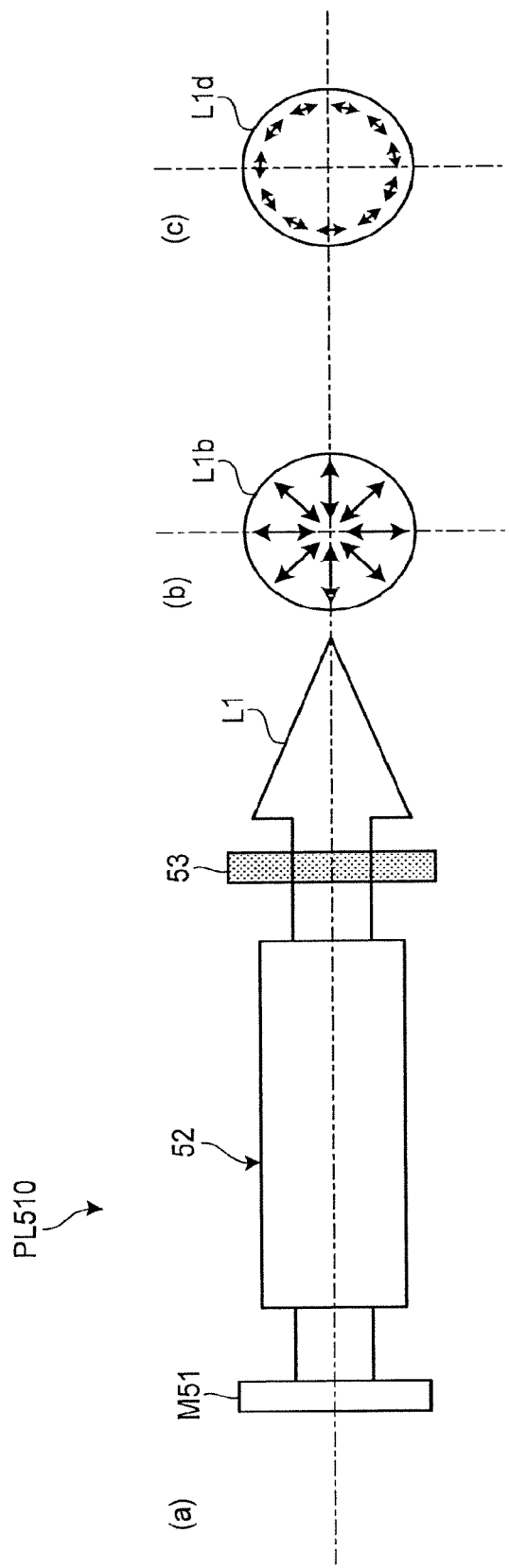
FIG. 35 schematically illustrates a configuration of a pre-pulse laser in accordance with the modification of the fifth embodiment.

FIG. 35 schematically illustrates the configuration of a pre-pulse laser in accordance with a modification of the fifth embodiment. As illustrated in FIG. 35, a transmissive-type polarization control element 53 may be used as a polarization control element for controlling the polarization state of the pre-pulse laser beam L1. Even with this configuration, the radially polarized or azimuthally polarized pre-pulse laser beam L1 can be generated.

As has been described above, according to the fifth embodiment, as in the above-described embodiments, it is possible to control the polarization state of at least the pre-pulse laser beam L1 that turns the target material (Sn) into the diffused target, of laser beams that turn the target material supplied as the droplet D into plasma. With this, the CE can be improved.

Sixth Embodiment

Figure 36:
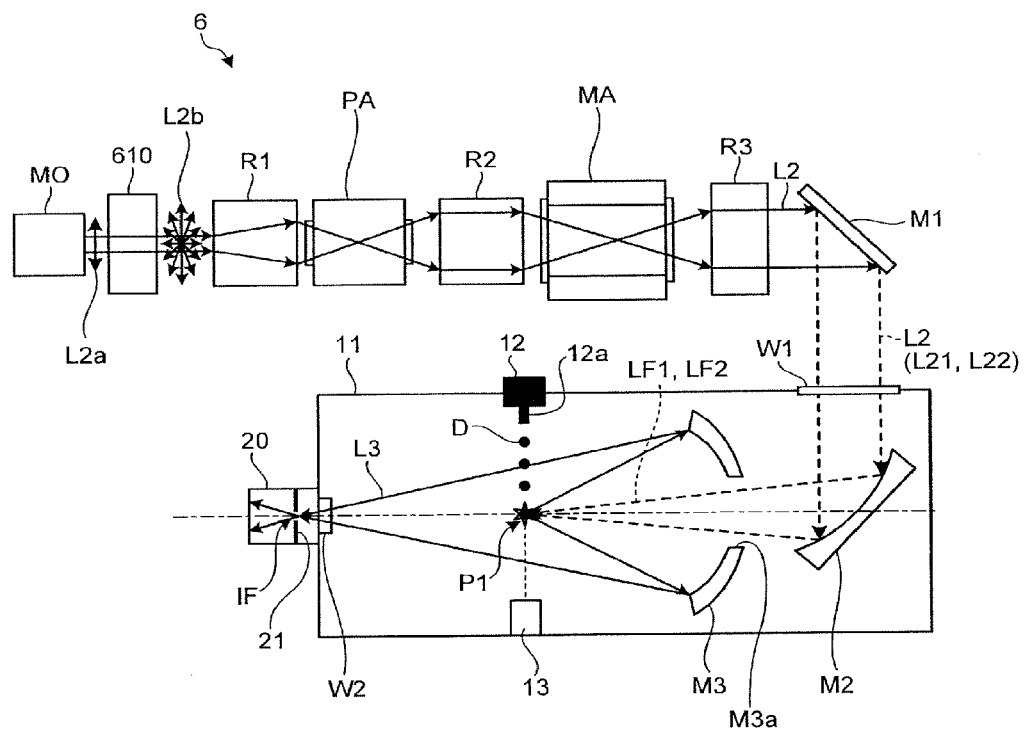
FIG. 36 schematically illustrates a configuration of an EUV light generation system in accordance with a sixth embodiment of this disclosure.

Next, an EUV light generation system in accordance with a sixth embodiment will be described in detail with reference to the drawing. In the sixth embodiment, a case where a droplet is turned into plasma with single irradiation will be described as an example. FIG. 36 schematically illustrates the configuration of the EUV light generation system in accordance with the sixth embodiment.

As illustrated in FIG. 36, an EUV light generation system 6 in accordance with the sixth embodiment may be similar in configuration to the EUV light generation system 1 illustrated in FIG. 1. However, in the sixth embodiment, only the main pulse laser beam L2 is introduced into the chamber 11 through the window W1. Further, in a modification of the sixth embodiment, a pre-pulse laser beam L21 and a main pulse laser beam L22 may be introduced into the chamber 11 via the window W1. Accordingly, the laser beam introduction mirror M1 may simply be a high-reflective mirror.

Further, as illustrated in FIG. 36, provided on a beam path of a main pulse laser beam L2a outputted from a master oscillator MO is a polarization control mechanism 610 for controlling a polarization state of the main pulse laser beam L2a. The polarization control mechanism 610 is preferably disposed at a position where the polarization control mechanism 610 can control the polarization state of the main pulse laser beam L2a before the main pulse laser beam L2a enters an amplifier. In particular, when the polarization control mechanism 610 is configured of a transmissive-type optical element, for example, disposing the polarization control mechanism 610 on the beam path between the master oscillator MO and the amplifier makes it possible to prevent the polarization control mechanism 610 from being deteriorated due to variation in temperature of the polarization control mechanism 610. Note that, in FIG. 36, a case where the polarization control mechanism 610 converts the linearly polarized main pulse laser beam L2a into a radially polarized main pulse laser beam L2b is shown as an example.

In this way, even when the droplet D is irradiated with only the main pulse laser beam L2 and is turned into plasma, the absorption of the laser energy on the surface of the droplet D can be improved by controlling the polarization state of the main pulse laser beam L2 to be either radial or azimuthal. In other words, it is possible to improve the CE.

Modification

Figure 37:
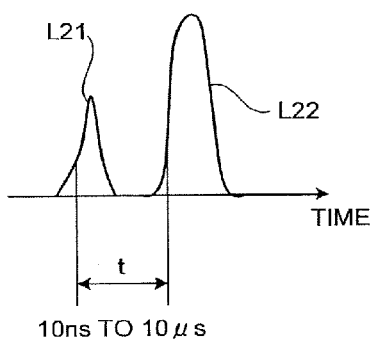
FIG. 37 schematically illustrates an exemplary pulse shape of a laser beam outputted from a master oscillator in accordance with a modification of the sixth embodiment.

FIG. 37 is a time waveform showing temporal change in intensity of a laser beam outputted from the master oscillator in accordance with a modification of the sixth embodiment. In the modification of the sixth embodiment, as illustrated in FIG. 37, the master oscillator MO may be configured to output both the pre-pulse laser beam L21 and the main pulse laser beam L22 with a time difference t. With this, as in any one of the above-described first through fifth embodiments, the droplet D is irradiated with the pre-pulse laser beam L21 and turned into the diffused target, and thereafter the diffused target is irradiated with the main pulse laser beam L22 and turned into plasma. Note that other configurations and effects are similar to those of the above-described sixth embodiment; thus, the duplicate description thereof is omitted here.

Seventh Embodiment

Figure 38:
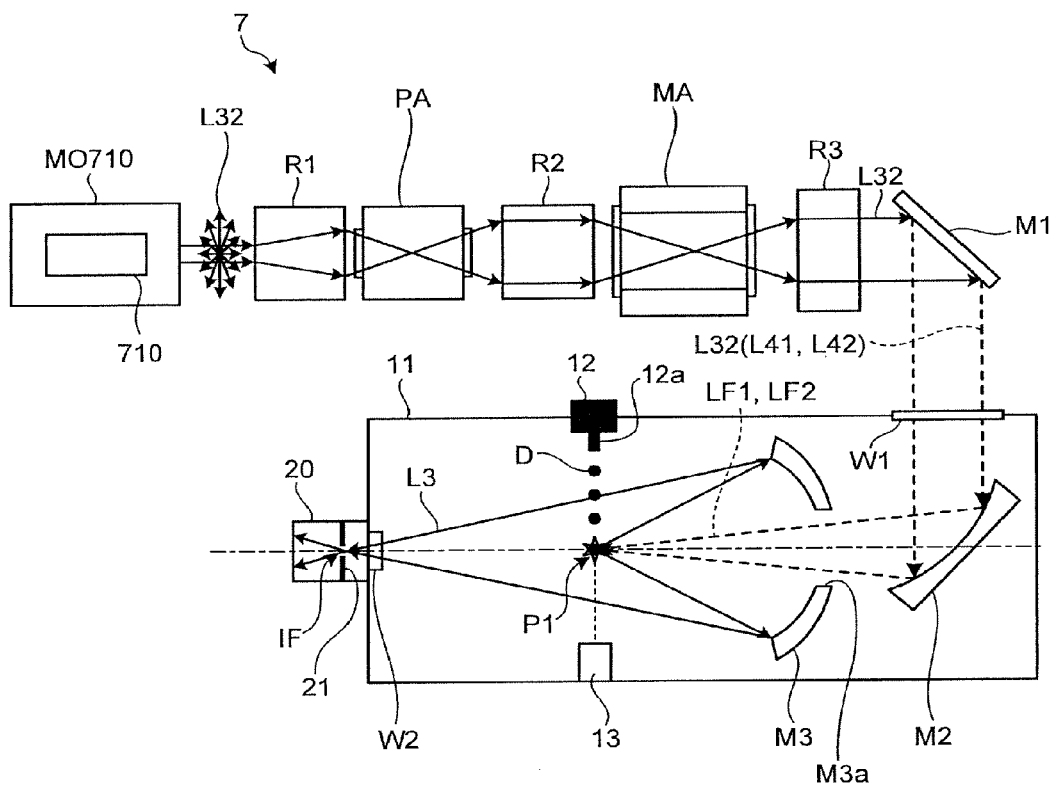
FIG. 38 schematically illustrates a configuration of an EUV light generation system in accordance with a seventh embodiment of this disclosure.

Next, an EUV light generation system in accordance with a seventh embodiment of this disclosure will be described in detail with reference to the drawing. In the seventh embodiment, a case where a droplet is turned into plasma with single irradiation and the master oscillator outputs a main pulse laser beam of which the polarization state is controlled is shown as an example. FIG. 38 schematically illustrates the configuration of the EUV light generation system in accordance with the seventh embodiment.

As illustrated in FIG. 38, an EUV light generation system 7 in accordance with the seventh embodiment may be similar in configuration to the EUV light generation system 6 illustrated in FIG. 36. In the seventh embodiment, however, the polarization control mechanism 610 is omitted and the master oscillator MO is replaced by a master oscillator MO710 including a polarization control element 710. In the seventh embodiment as well, only a main pulse laser beam L32 may be introduced into the chamber 11 via the window W1. In a modification of the seventh embodiment, a pre-pulse laser beam L41 and a main pulse laser beam L42 may be introduced into the chamber 11 via the window W1. Accordingly, the laser beam introduction mirror M1 may simply be a high-reflective mirror.

In this configuration, for the polarization control element 710 provided to the master oscillator MO710, either of the polarization control element 51 or 53 shown in any one of FIGS. 31 through 35 may be used. Other configurations and effects are similar to those of the above-described first through sixth embodiments; thus, the duplicate description thereof is omitted here.

Modification

Figure 39:
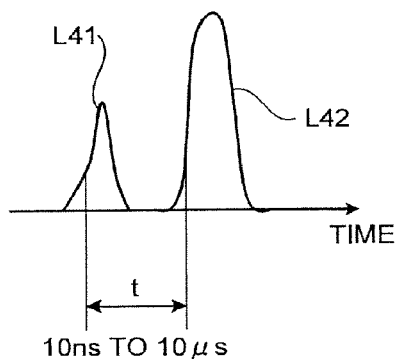
FIG. 39 schematically illustrates an exemplary pulse shape of a laser beam outputted from a master oscillator in accordance with a modification of the seventh embodiment.

FIG. 39 is a time waveform showing temporal change in intensity of a laser beam outputted from the master oscillator in accordance with a modification of the seventh embodiment. In the modification of the seventh embodiment, as in the above-described modification of the sixth embodiment, as illustrated in FIG. 39, the master oscillator MO710 may be configured to output both the pre-pulse laser beam L41 and the main pulse laser beam L42 with a time difference t. With this, as in any one of the above-described first through sixth embodiments, the droplet D is irradiated with the pre-pulse laser beam L41 and at least part of the droplet D is turned into the diffused target, and thereafter the diffused target is irradiated with the main pulse laser beam L42 and turned into plasma. Note that other configurations and effects are similar to those of the above-described seventh embodiment; thus, the duplicate description thereof is omitted here.

Eighth Embodiment

Next, an EUV light generation system in accordance with an eighth embodiment of this disclosure will be described with reference to the drawing. In the eighth embodiment, the pre-pulse laser beam is radially polarized and the main pulse laser beam is azimuthally polarized. Note that, in the eighth embodiment, only configurations different from those of the above-described first embodiment will be described, but this disclosure is not limited thereto.

Figure 40:
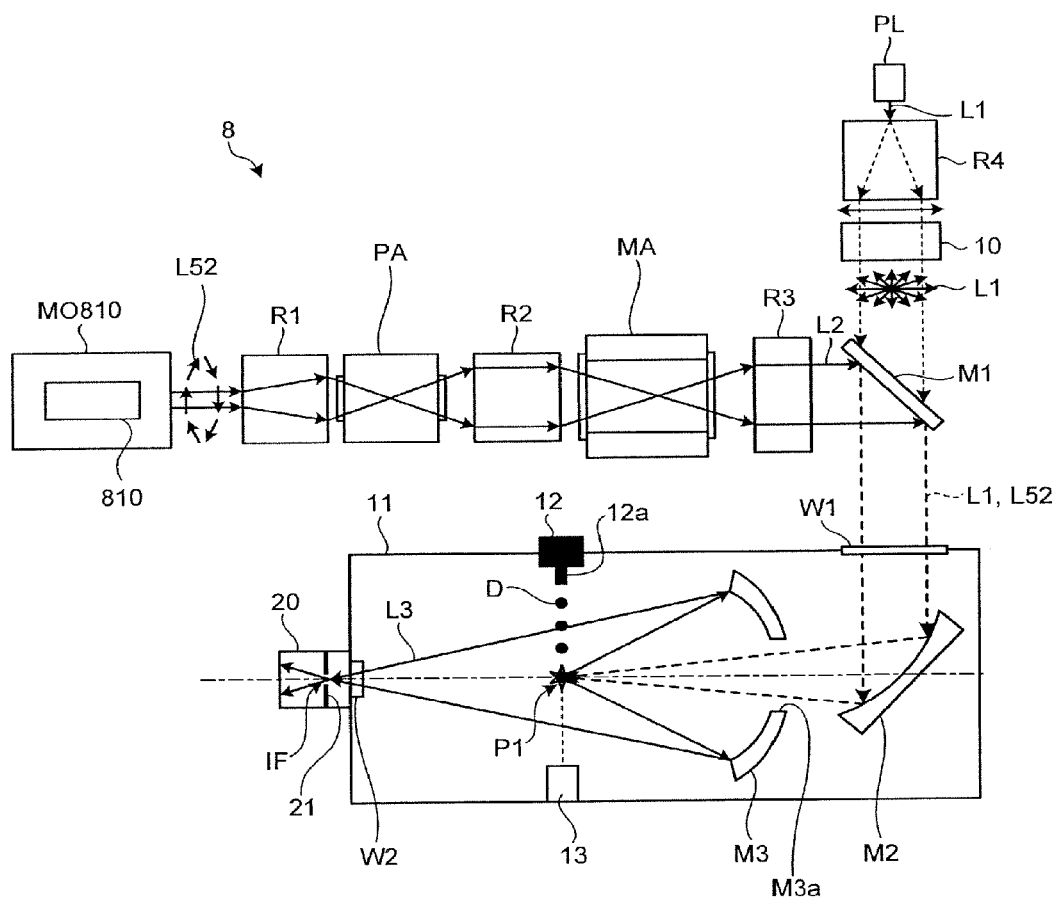
FIG. 40 schematically illustrates a configuration of an EUV light generation system in accordance with an eighth embodiment of this disclosure.

FIG. 40 schematically illustrates the configuration of an EUV light generation system in accordance with the eighth embodiment. As illustrated in FIG. 40, an EUV light generation system 8 in accordance with the eighth embodiment may be similar in configuration to the EUV light generation system 1 illustrated in FIG. 1, but the master oscillator MO is replaced by a master oscillator MO810 including a polarization control element 810 which converts a laser beam into an azimuthally polarized laser beam. Accordingly, a main pulse laser beam L52 outputted from the master oscillator MO810 is an azimuthally polarized laser beam.

In this way, the pre-pulse laser beam L1 is radially polarized and the main pulse laser beam L52 is azimuthally polarized, whereby the absorption of the pre-pulse laser beam L1 can be increased and the generation efficiency of the diffused target can be improved. As a result, the emission efficiency of the EUV light L3 can be improved. Other configurations and effects are similar to those of the above-described first through seventh embodiments; thus, the duplicate description thereof is omitted here.

Ninth Embodiment

Next, an EUV light generation system in accordance with a ninth embodiment of this disclosure will be described in detail with reference to the drawings. In the ninth embodiment, a solid target will be used as a target in place of the droplet D. Note that the ninth embodiment will be described while citing the above-described first embodiment, but this disclosure is not limited thereto.

Figure 41:
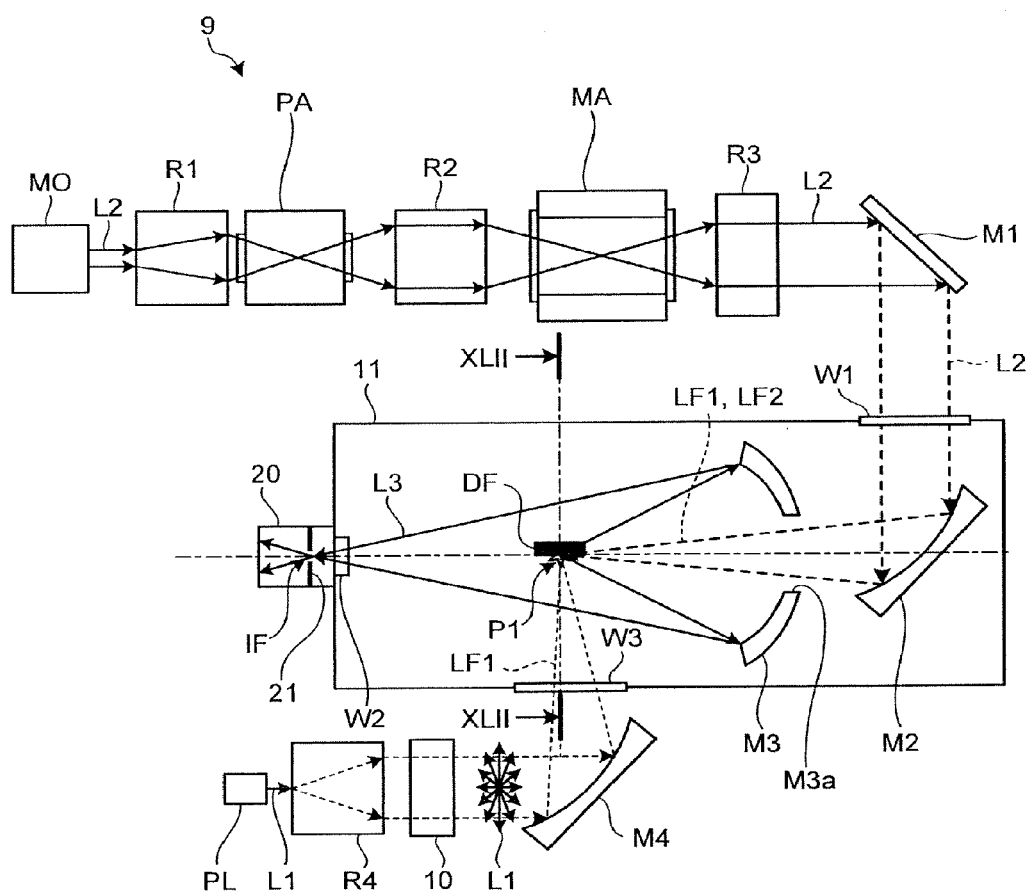
FIG. 41 schematically illustrates a configuration of an EUV light generation system in accordance with a ninth embodiment of this disclosure.
Figure 42:
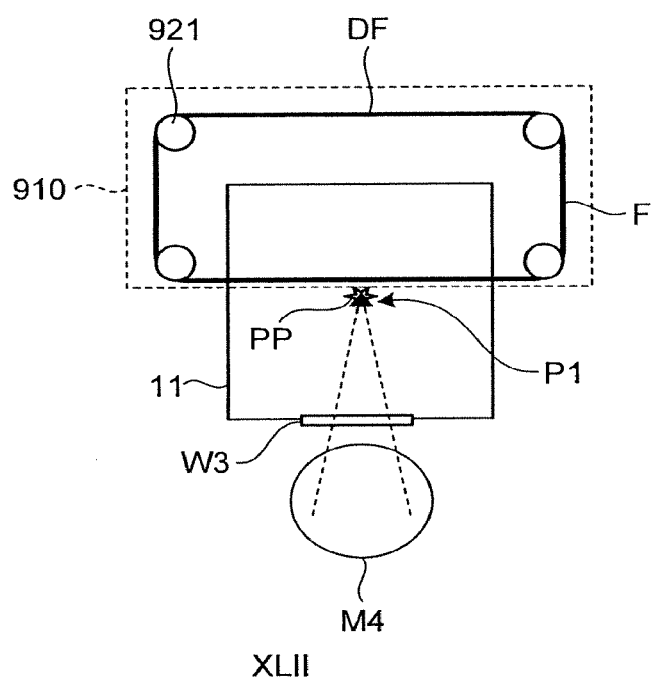
FIG. 42 schematically illustrates an exemplary configuration of a film-type target supply unit for supplying a film-type target into a chamber of the EUV light generation system in accordance with the ninth embodiment.

FIG. 41 schematically illustrates the configuration of an EUV light generation system in accordance with the ninth embodiment. FIG. 42 is a sectional view schematically illustrating the EUV light generation system illustrated in FIG. 41, taken along line XLII-XLII, which schematically illustrates a configuration of film-type target supply unit that supplies a film-type target in the chamber of the EUV light generation system in accordance with the ninth embodiment.

As illustrated in FIG. 41, an EUV light generation system 9 in accordance with the ninth embodiment may be similar in configuration to the EUV light generation system 4 illustrated in FIGS. 29 and 30. As illustrated in FIGS. 41 and 42, however, in the EUV light generation system 9, the droplet generator 12 is replaced by a film-type target supply unit 910.

As illustrated in FIG. 42, the film-type target supply unit 910 may comprise a film-type target DF that is rotated with being supported by a plurality of rollers 921, at least one of the rollers 921 being driven-type. The film-type target DF may be ribbon composed of Sn, which is the target material, or a ribbon-like member with Sn coated thereon. The film-type target DF is disposed such that the film-type target DF passes through the plasma generation region P1 from the exterior of the chamber 11, for example. In the film-type target supply unit 910, rotation driven-type roller 921 is driven at least at the time of generating plasma. With this, an unused region of the film-type target DF is supplied to the plasma generation region P1 at the time of generating plasma. When the film-type target DF is irradiated with the pre-pulse laser beam of which the polarization state is controlled, the laser energy is absorbed efficiently, whereby the diffused target is generated. Thereafter, the diffused target is irradiated with the main pulse laser beam, whereby plasma is generated and the EUV light is emitted. In this way, regardless of the form of the target, when the target is irradiated with a laser beam of which the polarization state is controlled, the EUV light can be generated efficiently.

Other configurations and effects are similar to those of the above-described first through eighth embodiments; thus, the duplicate description thereof is omitted here.

Tenth Embodiment

Next, an EUV light generation system in accordance with a tenth embodiment of this disclosure will be described in detail with reference to the drawing. In the tenth embodiment, beam profile in a plane perpendicular to the beam axis of the laser beam may be controlled. The beam profile may be controlled such that the beam profile at a position where a droplet is irradiated therewith has desired uniformity in a region larger than a predetermined region. The predetermined region, for example, means a circular region having a diameter larger than the diameter of the droplet, when the droplet is spherical. The desired uniformity of the beam profile of the laser beam means such profile that difference between the maximum value and the minimum value of beam intensity fall within a predetermined range. In the tenth embodiment, only configurations that differ from those of the above-described first embodiment will be described, but this disclosure is not limited thereto.

Figure 43:
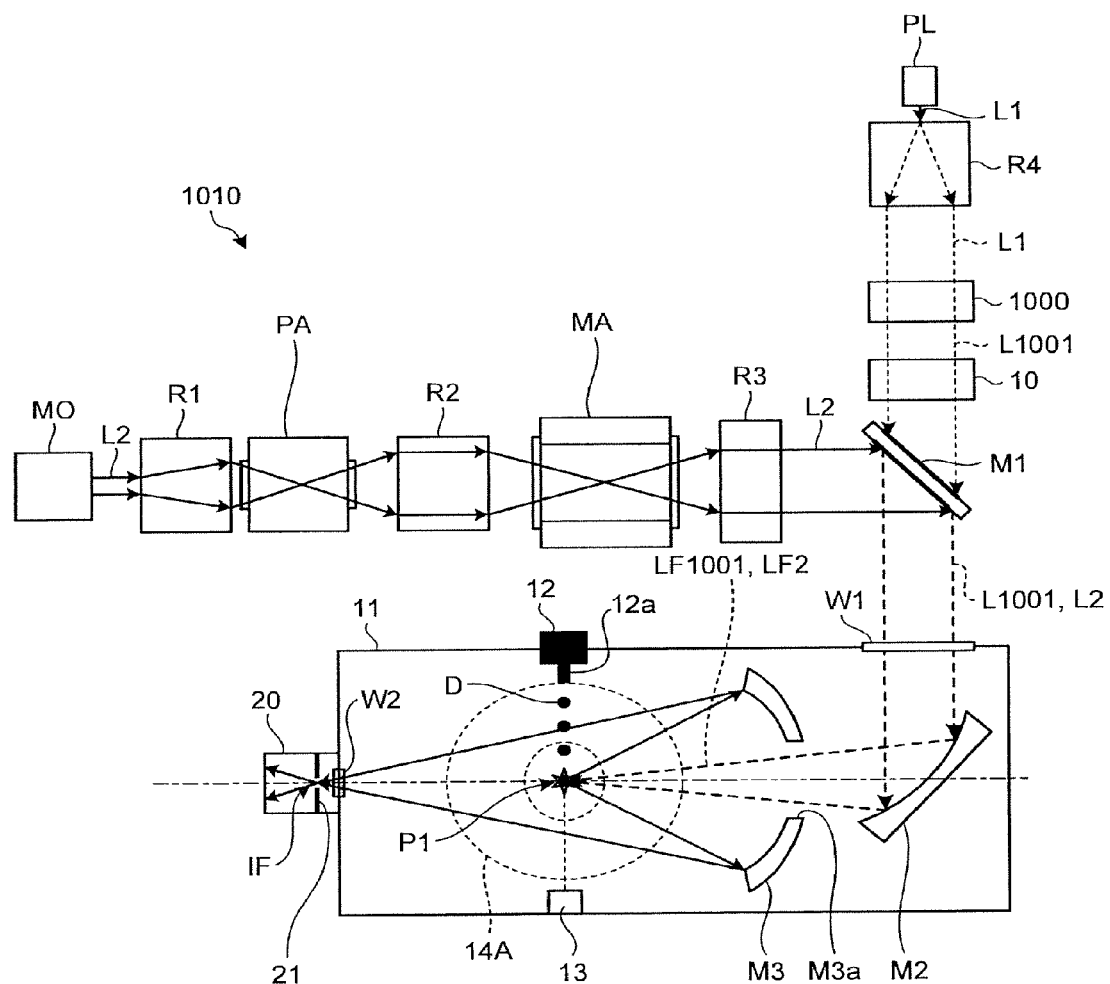
FIG. 43 schematically illustrates a configuration of an EUV light generation system in accordance with a tenth embodiment of this disclosure.

FIG. 43 schematically illustrates the configuration of the EUV light generation system in accordance with the tenth embodiment. As illustrated in FIG. 43, an EUV light generation system 1010 in accordance with the tenth embodiment may be similar in configuration to the EUV light generation system 1 illustrated in FIG. 1, and may further comprise a top-hat transformation mechanism 1000 that controls the beam profile in a plane perpendicular to the beam axis of the pre-pulse laser beam that is focused on the droplet. The top-hat transformation mechanism 1000 may be disposed between the pre-pulse laser PL and the polarization control mechanism 10, for example. Alternatively, the top-hat transformation mechanism 1000 may be disposed downstream in the beam path from the polarization control mechanism 10. Hereinafter, the pre-pulse laser beam L1 of which the beam profile has been controlled by the top-hat transformation mechanism 1000 is referred to as a top-hat pre-pulse laser beam L1001. Other configurations are similar to those of the EUV light generation system 1 illustrated in FIG. 1.

Figure 44:
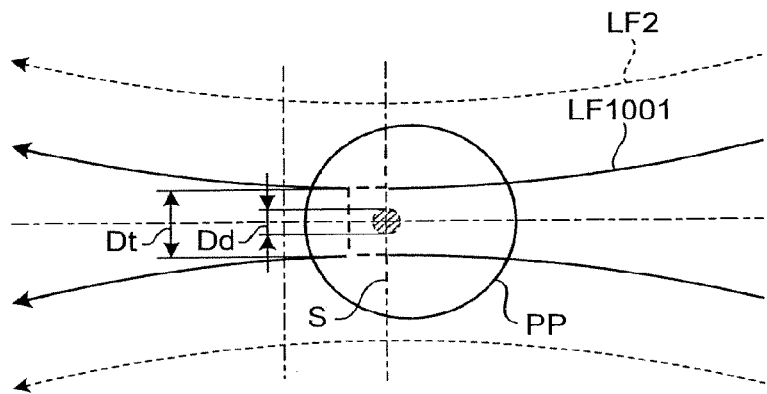
FIG. 44 schematically illustrates relationship between a droplet and a top-hat pre-pulse focused laser beam, which is a focused laser beam of a top-hat pre-pulse laser beam, in accordance with the tenth embodiment.
Figure 45:
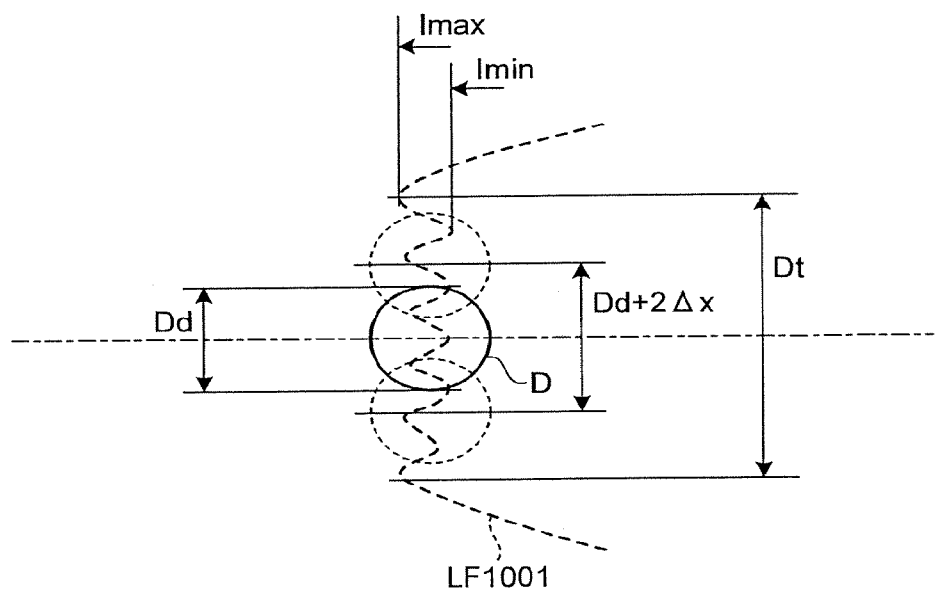
FIG. 45 illustrates the droplet in FIG. 44 and the vicinity thereof in enlargement.

Here, relationship between the top-hat pre-pulse laser beam L1001 and the droplet D will be described in detail with reference to the drawings. In the subsequent description, a case where the droplet D is a mass-limited droplet will be shown as an example. FIG. 44 schematically illustrates relationship between the droplet and the top-hat pre-pulse focused laser beam in which the top-hat pre-pulse laser beam is focused in accordance with the tenth embodiment. FIG. 45 illustrates the droplet illustrated in FIG. 44 and the vicinity thereof in enlargement.

As illustrated in FIG. 44, a beam profile S of the top-hat pre-pulse focused laser beam LF1001 in which the top-hat pre-pulse laser beam L1001 is focused is flat in a range Dt within a circle having a diameter at least equal to or larger than a diameter Dd of the droplet D. Note that the beam intensity within the range Dt does not necessarily have to be uniform. Here, the beam profile S indicates the beam profile along a cross-section.

Here, the uniformity in the beam profile S within the range Dt will be described. In FIGS. 44 and 45, the required range Dt may be expressed in the following formula (1) and uniformity C of the beam profile S within the range Dt may be expressed in the following formula (2), where Dd is the diameter of the droplet D, ΔX is a half-width of a range of variation in a center position of the droplet D when the droplet D is irradiated with a laser beam at the plasma generation region P1 with a predetermined number of irradiation as a modulus, Dt is a range of a flat area in the beam profile S, Imax is the maximum value of the intensity within the range Dt, and Imin is the minimum value of the intensity within the range Dt.

$$Dt \geq Dd + 2\Delta X \quad (1)$$

$$C = (Imax - Imin)/(Imax + Imin) \times 100(\%) \quad (2)$$

In this way, the beam profile S may have a plurality of peaks and a plurality of bottoms within the range Dt. In this case, however, a gap between adjacent peak and bottom is, preferably, sufficiently small with respect to the diameter Dd of the droplet D. The uniformity C is preferably at or below 20%, and is more preferably at or below 10%.

When the droplet is irradiated with a pre-pulse focused laser beam having such flat beam profile, a position where the diffused target is generated will be stabilized even when the variation ΔX in the position of the droplet at the time of irradiation exists. As a result, stability in the EUV energy when the EUV light is emitted by irradiating the diffused target with the main pulse laser beam to generate plasma must be improved.

Top-Hat Transformation Mechanism

Figure 46:
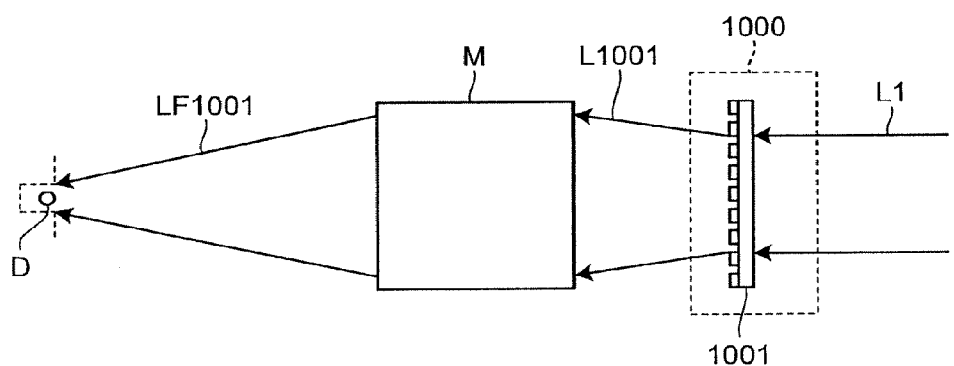
FIG. 46 schematically illustrates an exemplary configuration of a top-hat transformation mechanism in accordance with the tenth embodiment.

Next, a top-hat transformation mechanism in accordance with the tenth embodiment will be described in detail with reference to the drawing. FIG. 46 schematically illustrates the configuration of the top-hat transformation mechanism in accordance with the tenth embodiment. As illustrated in FIG. 46, a top-hat transformation mechanism 1000 may be configured of a high precision diffractive optical element (DOE) 1001. The DOE 1001 may comprise a high precision grating on a surface on which the pre-pulse laser beam L1 is incident or on a surface from which the pre-pulse laser beam L1 exits. The pre-pulse laser beam L1 having exited from the DOE 1001 is three-dimensionally diffracted. As a result, the beam profile of the pre-pulse laser beam L1 is adjusted, and the pre-pulse laser beam L1 is turned into a top-hat pre-pulse laser beam L1001. The outputted top-hat pre-pulse laser beam L1001 passes through a focusing optical system M, is turned into the top-hat pre-pulse focused laser beam LF1001, and is focused in the plasma generation region P1 inside the chamber 11 so that the beam profile thereof is substantially flat in the predetermined region at a position where the droplet D is irradiated therewith. Note that the focusing optical system M may include the polarization control mechanism 10, the laser beam introduction mirror M1, the off-axis paraboloidal mirror M2, and so forth. Further, a transmissive-type DOE is illustrated as an example in FIG. 46, but without being limited thereto, a reflective-type DOE may also be used.

First Modification of Top-Hat Transformation Mechanism

Figure 47:
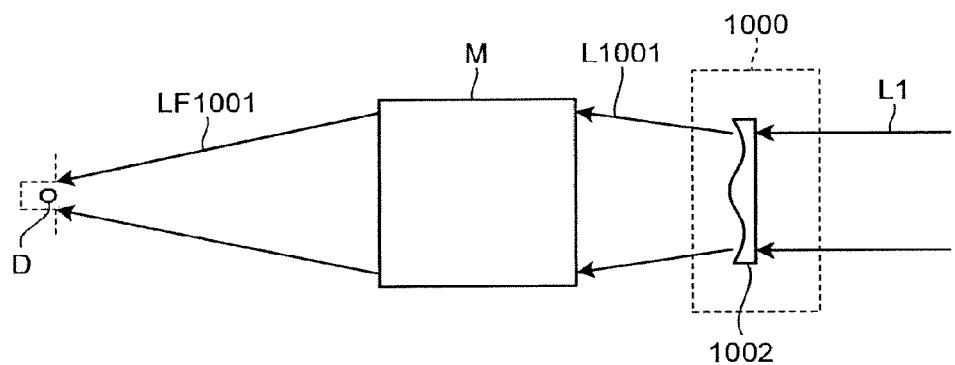
FIG. 47 schematically illustrates a configuration of a top-hat transformation mechanism in accordance with a first modification of the tenth embodiment.

FIG. 47 schematically illustrates the configuration of a top-hat transformation mechanism in accordance with a first modification of the tenth embodiment. As illustrated in FIG. 47, the top-hat transformation mechanism 1000 in accordance with the tenth embodiment may also be configured of a phase optical element 1002. The phase optical element 1002 has a wave-like shaped surface on which the pre-pulse laser beam L1 is incident or from which the pre-pulse laser beam L1 exits. Thus, the pre-pulse laser beam L1 passing through the phase optical element 1002 is subjected to a phase shift in accordance with the position through which the pre-pulse laser beam L1 passes. As a result, the beam profile of the pre-pulse laser beam L1 is adjusted, and the pre-pulse laser beam L1 is turned into the top-hat pre-pulse laser beam L1001. Then, the top-hat pre-pulse laser beam L1001 is turned into the top-hat pre-pulse focused laser beam LF1001 through the focusing optical system M, and is focused in the plasma generation region P1 inside the chamber 11 so that the beam profile thereof is substantially flat in the predetermined region at a position where the droplet D is irradiated therewith. Note that a transmissive-type phase optical element is illustrated as an example in FIG. 47, but without being limited thereto, a reflective-type phase optical element may also be used.

Second Modification of Top-Hat Transformation Mechanism

Figure 48:
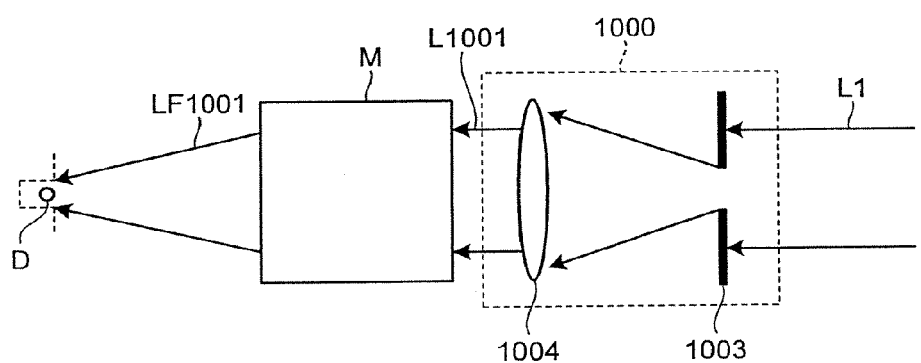
FIG. 48 schematically illustrates a configuration of a top-hat transformation mechanism in accordance with a second modification of the tenth embodiment.

FIG. 48 schematically illustrates the configuration of a top-hat transformation mechanism in accordance with a second modification of the tenth embodiment. As illustrated in FIG. 48, the top-hat transformation mechanism 1000 in accordance with the tenth embodiment may be configured of a mask 1003 that transmits only a portion of the pre-pulse laser beam L1 where the beam profile is flat and a collimator lens 1004 that turns the pre-pulse laser beam L1 of which the divergence angle has spread after passing through the mask 1003 into a collimated beam. In this case, the image at the mask 1003 may be imaged at the position where the droplet is irradiated through the collimator lens 1004 and the focusing optical system M.

Third Modification of Top-Hat Transformation Mechanism

Figure 49:
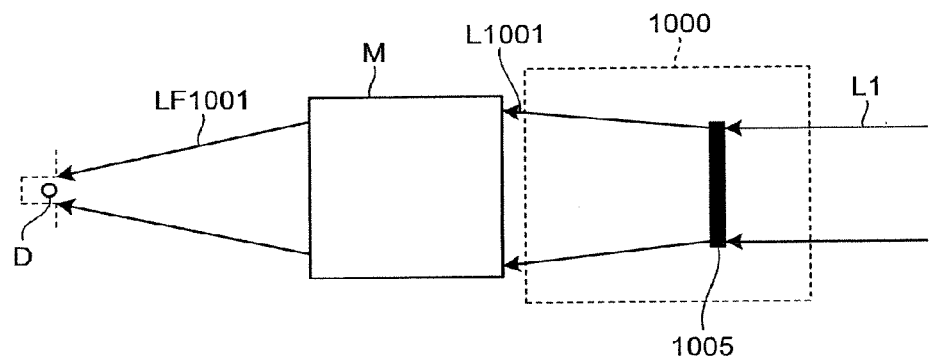
FIG. 49 schematically illustrates a configuration of a top-hat transformation mechanism in accordance with a third modification of the tenth embodiment.

FIG. 49 schematically illustrates the configuration of a top-hat transformation mechanism in accordance with a third modification of the tenth embodiment. As illustrated in FIG. 49, the top-hat transformation mechanism 1000 in accordance with the third modification of the tenth embodiment may be configured of a micro fly-eye optical element 1005 in which a plurality of tiny concave lenses is two-dimensionally arranged on a surface on which the pre-pulse laser beam L1 is incident or from which the pre-pulse laser beam L1 exits. A beam incident on the micro fly-eye optical element 1005 has the divergence angle thereof increased, and each beam of which the divergence angle is increased is made to be superimposed on each other at a focal plane of the focusing optical system by the focusing optical system M. As a result, the beam profile at the focal place of the focusing optical system M can be made flat by so-called Koehler illumination. Further, the micro fly-eye optical element 1005 may be a micro fly-eye lens configured of tiny convex lenses.

Further, in the examples of the top-hat transformation mechanisms illustrated in FIGS. 46 through 49, a case where the top-hat transformation mechanism is configured of the focusing element and the top-hat transformation mechanism has been illustrated, but the configuration may be such that the focusing optical system and the top-hat transformation mechanism are integrally formed into one element. For example, the top-hat transformation mechanism may be an element on which concavities and convexities serving as a diffractive optical element are formed on a focusing lens, or may be an optical element in which a phase shifting function is provided to a focusing mirror. Note that other configurations and effects are similar to those of the above-described first through ninth embodiments; thus, the duplicate description thereof is omitted here.

Eleventh Embodiment

Next, an EUV light generation system in accordance with an eleventh embodiment of this disclosure will be described in detail with reference to the drawing. The top-hat transformation mechanism in accordance with the above-described tenth embodiment may, for example, be applied to a case where the pre-pulse laser beam L1 and the main pulse laser beam L2 strike the target material in differing directions.

Figure 50:
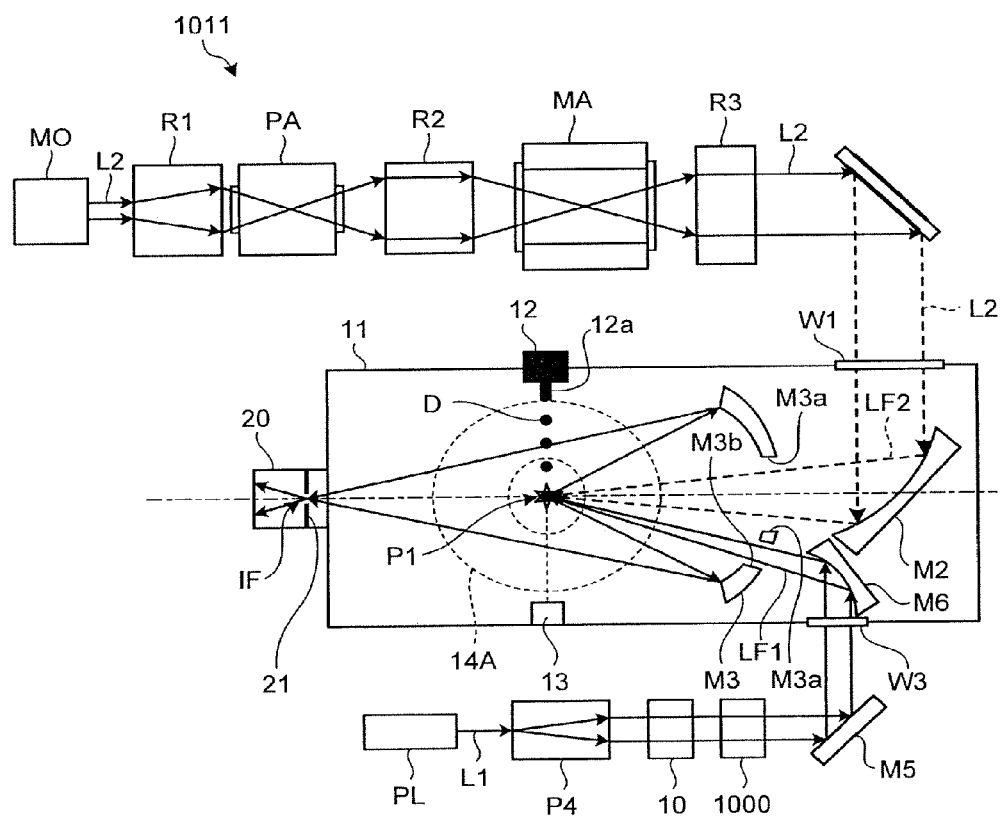
FIG. 50 schematically illustrates a configuration of an EUV light generation system in accordance with an eleventh embodiment of this disclosure.

FIG. 50 schematically illustrates the configuration of the EUV light generation system in accordance of the eleventh embodiment. As illustrated in FIG. 50, an EUV light generation system 1011 in accordance with the eleventh embodiment may be similar in configuration to the EUV light generation system 4 illustrated in FIGS. 29 and 30, and the top-hat transformation mechanism 1000 is provided downstream in the beam path from the polarization control mechanism 10. Alternatively, the top-hat transformation mechanism 1000 may be disposed upstream in the beam path from the polarization control mechanism 10. Other configurations are similar to those of the EUV light generation system 4 illustrated in FIGS. 29 and 30. However, the off-axis paraboloidal mirror M4 for focusing the pre-pulse laser beam L1 in the plasma generation region P1 as illustrated in FIG. 30 is replaced by a high-reflective mirror M5 having a flat reflective surface and an off-axis paraboloidal mirror M6 disposed inside the chamber 11 in an example illustrated in FIG. 50. Other configurations and effects are similar to those of the above-described first through tenth embodiments; thus, the duplicate description thereof is omitted here.

Such configuration makes it possible to optimize the absorption of the pre-pulse focused laser beam by the droplet D, and the droplet D can be irradiated with the pre-pulse focused laser beam with flat beam profile. Thus, energy required to generate the diffused target can be reduced and the state of the generated diffused target can be stabilized. As a result, the energy of the EUV light can further be stabilized while maintaining high conversion efficiency.

Twelfth Embodiment

The pre-pulse laser beam and/or the main pulse laser beam with which the target is irradiated are not limited to a radially polarized laser beam, an azimuthally polarized laser beam or a linearly polarized laser beam. For example, it may be a circularly polarized laser beam or a laser beam in which direction of linear polarization is randomly oriented. Thus, in the twelfth embodiment, a case where the pre-pulse laser beam and/or the main pulse laser beam are controlled to be a circularly polarized laser beam will be illustrated as an example.

Figure 51:
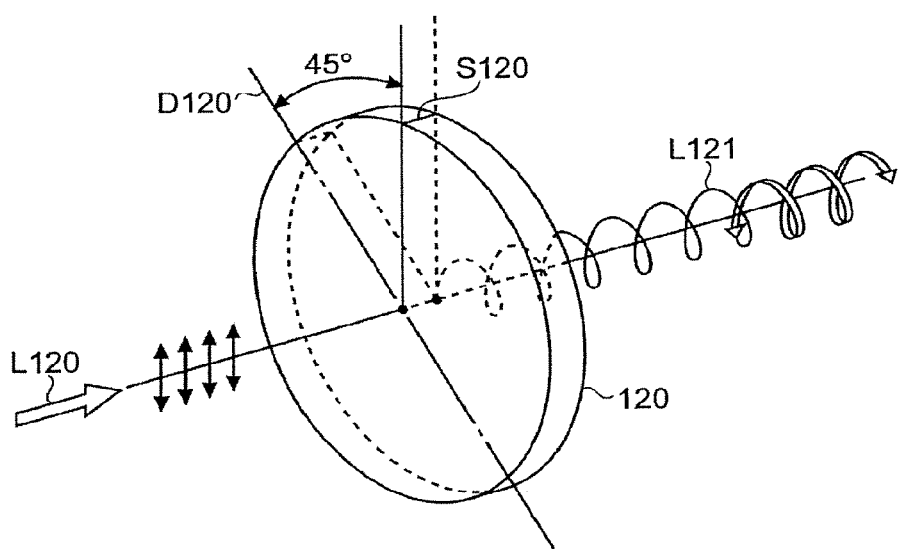
FIG. 51 schematically illustrates an example of a polarization control mechanism in accordance with a twelfth embodiment of this disclosure.

FIG. 51 schematically illustrates the configuration of a polarization control mechanism in accordance with the twelfth embodiment. As illustrated in FIG. 51, a transmissive-type quarter wave plate 120 may be used as the polarization control mechanism in the twelfth embodiment. The quarter wave plate 120 may be disposed such that the incident surface thereof is perpendicular to the beam axis of the incident beam L120. At this time, as illustrated in FIG. 51, when a polarization direction 5120 of the linearly polarized incident beam L120 is inclined 45° with respect to an optic axis D120 of a crystal constituting the quarter wave plate 120, an output beam L121 having passed through the quarter wave plate 120 may be turned into a circularly polarized laser beam. Alternatively, when the polarization direction 5120 of the linearly polarized incident beam L120 is inclined −45° with respect to the optic axis D120, a rotational direction of the circularly polarized output beam L121 may be reversed. In this way, a linearly polarized laser beam may be converted into a circularly polarized laser beam by using the quarter wave plate 120.

Figure 52:
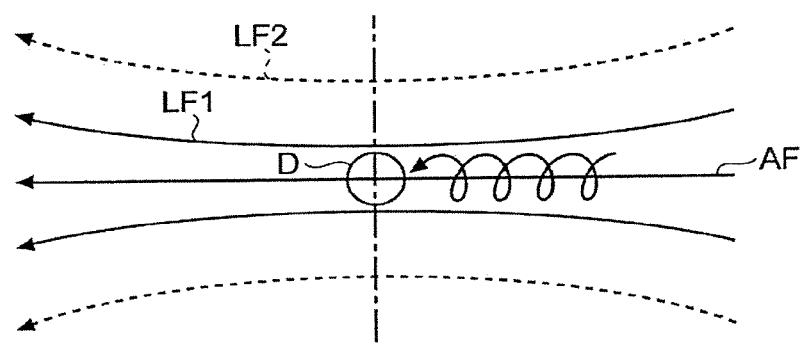
FIG. 52 schematically illustrates a droplet viewed in a direction perpendicular to a beam axis of a pre-pulse laser beam, in plasma generation process in accordance with the twelfth embodiment.
Figure 53:
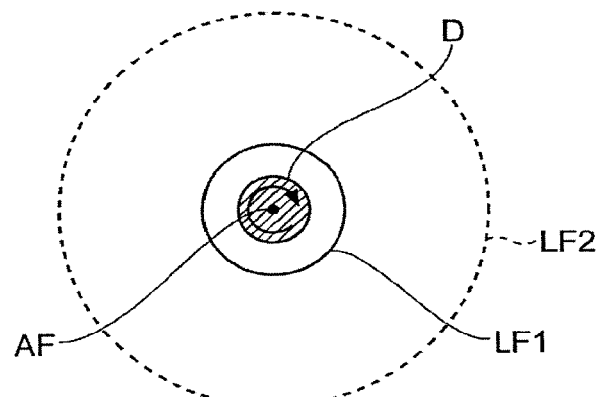
FIG. 53 schematically illustrates the droplet viewed in the direction of the beam axis of the pre-pulse laser beam, in the plasma generation process in accordance with the twelfth embodiment.
Figure 54:
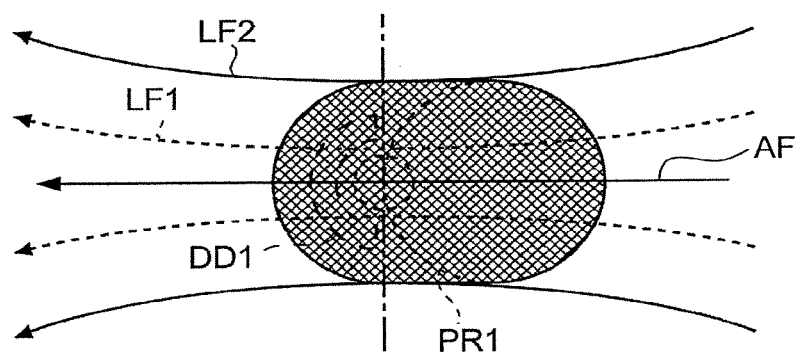
FIG. 54 schematically illustrates fragments and plasma viewed in the direction perpendicular to the beam axis of the pre-pulse laser beam, in the plasma generation process in accordance with the twelfth embodiment.
Figure 55:
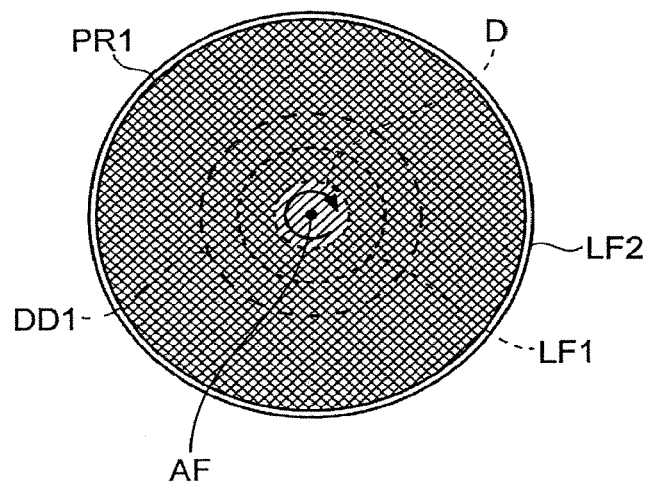
FIG. 55 schematically illustrates the fragments and the plasma viewed in the direction of the beam axis of the pre-pulse laser beam, in the plasma generation process in accordance with the twelfth embodiment.

As illustrated in FIGS. 52 and 53, for example, when the pre-pulse focused laser beam LF1 with which the droplet D serving as the target is irradiated is a circularly polarized laser beam, absorption index profile of the pre-pulse focused laser beam LF1 at the surface of the droplet D may be symmetrical with respect to the beam axis AF of the pre-pulse focused laser beam LF1. In this case, the beam axis AF preferably substantially coincides with the center of the droplet D. As a result, as illustrated in FIGS. 54 and 55, the pre-plasma PP1 and/or the fragments DD1 are diffused symmetrically with respect to the beam axis AF. The pre-plasma PP1 and/or the fragments DD1 which have been diffused symmetrically may be irradiated with the main pulse focused laser beam LF2.

In this way, when the pre-pulse laser beam L1 is circularly polarized, the absorption index profile of the pre-pulse focused laser beam LF1 by the droplet D may be symmetrical with respect to the beam axis AF. With this, the pre-plasma PP1 and/or the fragments DD1 derived from the droplet D may also be diffused symmetrically with respect to the beam axis AF. When the target material is diffused symmetrically as described above, the pre-plasma PP1 and/or the fragments DD1 which are irradiated with the main pulse focused laser beam LF2 will have a circular cross-section. When the main pulse focused laser beam LF2 has a circular cross-section and the cross-section is substantially the same shape as the cross-section of the target material, the CE may be improved in some cases.

Further, the polarization control mechanism in accordance with the twelfth embodiment and one of the above-described top-hat transformation mechanisms can be provided together on a beam path along which only the pre-pulse laser beam L1 passes. With this, even when the position of the droplet D in the plasma generation region P1 varies, the entire irradiation surface of the droplet D is irradiated with the circularly polarized top-hat pre-pulse focused laser beam LF1001 with flat beam profile, and the absorption index profile of the top-hat pre-pulse focused laser beam LF1001 by the droplet D can be made symmetrical with respect to the beam axis AF. As a result, the state of the generated diffused target can be prevented from being fluctuated, and the target can be diffused symmetrically with respect to the beam axis AF, whereby the EUV light L3 can be generated more stably.

The transmissive-type quarter wave plate 120 has been used as the polarization control mechanism above, but without being limited thereto, a reflective-type quarter wave plate may be used as well. In addition, in the twelfth embodiment, a case where a linearly polarized laser beam is converted into a circularly polarized laser beam using a quarter wave plate has been shown as an example. Other configurations and effects are similar to those of the above-described first through eleventh embodiments; thus, the duplicate description thereof is omitted here.

Thirteenth Embodiment

Figure 56:
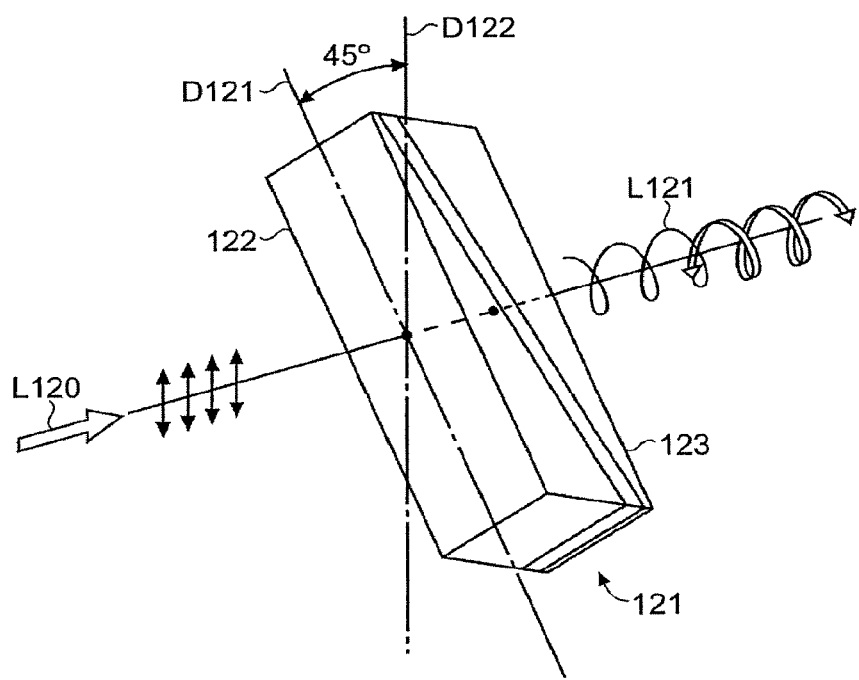
FIG. 56 schematically illustrates an example of a polarization control mechanism in accordance with a thirteenth embodiment of this disclosure.

Further, the pre-pulse laser beam and/or the main pulse laser beam with which the target is irradiated may be elliptically polarized. An elliptically polarized laser beam may be obtained by a polarization control mechanism using a Babinet-Soleil compensator 121, for example, as illustrated in FIG. 56. However, the configuration is not limited thereto.

As illustrated in FIG. 56, the Babinet-Soleil compensator 121 may include a first crystal 122 and a second crystal 123. The first crystal 122 and the second crystal 123 may each have a shape of a wedge substrate. Here, thickness of the entire Babinet-Soleil compensator 121 may be modified by moving either one of the first crystal 122 and the second crystal 123 in the direction of the optic axis thereof. Using this principle, a phase difference between the incident beam and the output beam may be modified relatively freely within a range from 0 to $\lambda/2$.

The Babinet-Soleil compensator 121 is preferably disposed such that the incident surface thereof is perpendicular to the beam axis of the incident beam L120. At this point, as illustrated in FIG. 56, the polarization direction D122 of the linearly polarized incident beam L120 is inclined 45° with respect to the optic axis D121 of the Babinet-Soleil compensator 121, and the second crystal 123 is displaced in the direction of D121 to regulate the phase difference, whereby the polarization state of the output beam L121 that has passed through the Babinet-Soleil compensator 121 can be controlled. For example, the output beam 121 may be made to be an elliptically polarized beam. By making the pre-pulse laser beam L1 an elliptically polarized laser beam, the pre-plasma PP1 and/or the fragments DD1 generated from the droplet D can be controlled to be diffused in desired profile. Other configurations and effects are similar to those of the above-described first through twelfth embodiments; thus, the duplicate description thereof is omitted here.

Fourteenth Embodiment

Figure 57:
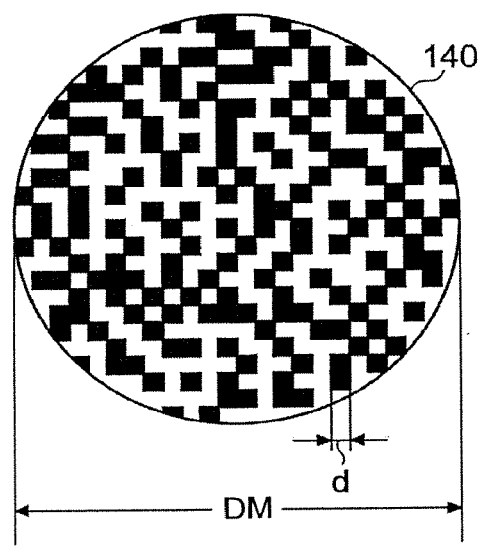
FIG. 57 schematically illustrates an example of a polarization control element in accordance with a fourteenth embodiment of this disclosure.

The pre-pulse laser beam and/or the main pulse laser beam with which the target is irradiated may be a laser beam having linear polarization components which are randomly oriented. Such laser beam can be obtained, as illustrated in FIG. 57, with a polarization control mechanism using a random phase plate 140, for example. However, the configuration is not limited thereto.

Figure 58:
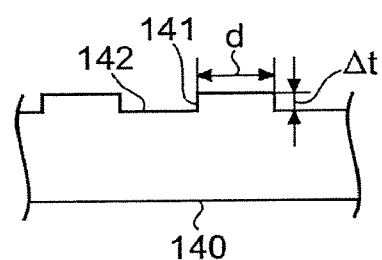
FIG. 58 is an exploded, fragmentary longitudinal sectional view of the polarization control element illustrated in FIG. 57.
Figure 59:
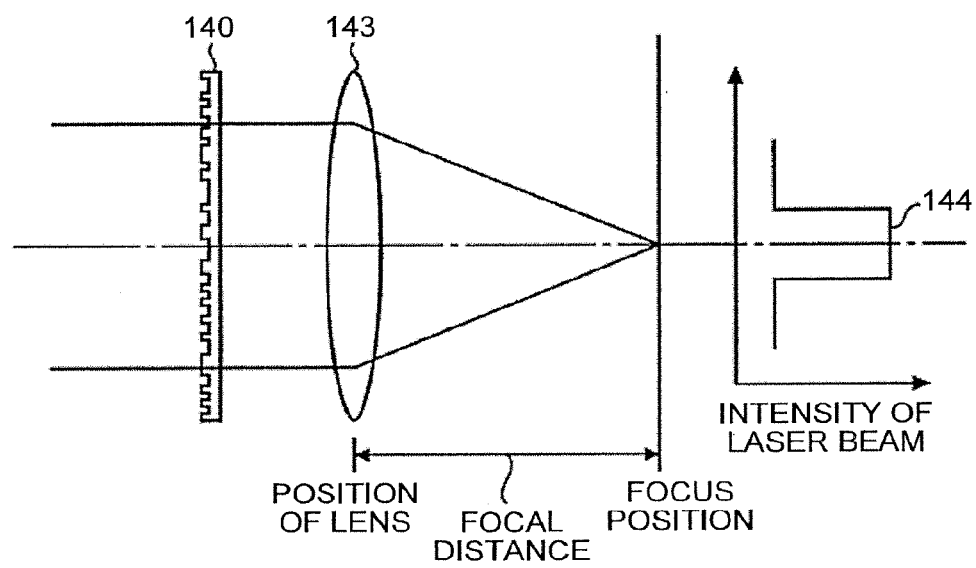
FIG. 59 illustrates an exemplary arrangement of the polarization control element illustrated in FIG. 57.

As illustrated in FIGS. 57 and 58, the random phase plate 140 may be configured such that tiny concavities and convexities having a pixel size d are randomly arranged two-dimensionally on an incident surface, an output surface, or a reflective surface of a disc having a diameter D, for example. The random phase plate 140 may divide an incident beam having a diameter DM into tiny beams having the pixel size d. The phase difference between a tiny beam passing through a convex portion 141 and a tiny beam passing through a concave portion 142 can be made to be $\pi$, for example. This, for example, as illustrated in FIG. 58, is made possible by satisfying the condition $\Delta t = \lambda/2(n1-1)$, in which $\Delta t$ is the difference in height between the convex portion 141 and the concave portion 142 (or thickness of the convex portion 141), $\lambda$ is the wavelength of an incident beam, and n1 is a refractive index. Although the transmissive-type random phase plate 140 has been shown as an example above, it is possible to yield the phase difference of $\pi$, for example, with a reflective-type random phase plate as well. As illustrated in FIG. 59, the random phase plate 140 may be disposed immediately before a focusing lens 143 (or focusing mirror).

In this way, by making the pre-pulse laser beam L1 a laser beam having linear polarization components which are randomly oriented, the absorption of the laser beam on the surface of the droplet can be made uniform. With this, the pre-plasma PP1 and/or the fragments DD1 generated from the droplet D can be made to be diffused symmetrically with respect to the axis of the laser beam. As a result, the CE can be improved in some cases. Further, with the laser beam having linear polarization components which are randomly oriented, the beam profile of the pre-pulse laser beam L1 can be made to be a profile having substantially flat beam profile (top-hat form 144), as shown in FIG. 59.

Disposing the random phase plate 140 on the beam path along which only the pre-pulse laser beam L1 passes makes it possible to irradiate a droplet with a laser beam having substantially flat beam profile. With this, positional stability of the pre-plasma PP1 and/or the fragments DD1 generated from the droplet D may be improved in some cases. Further, disposing another random phase plate on the beam path along which only the main pulse laser beam L2 passes makes it possible to irradiate the pre-plasma PP1 and/or the fragments DD1 having substantially flat beam profile, whereby the EUV light L3 having substantially flat beam profile may be generated in some cases. Other configurations and effects are similar to those of the above-described first through thirteenth embodiments; thus, the duplicate description thereof is omitted here.

The above-described embodiments and the modifications thereof are merely examples for implementing this disclosure, and this disclosure is not limited thereto. Making various modifications in accordance with specifications is within the scope of this disclosure. Further, it is apparent from the above description that various other embodiments that fall within the scope of this disclosure can be made. For example, it is needless to state that the modifications indicated for each embodiment can be applied to other embodiments as well.

The invention claimed is:

1. An extreme ultraviolet light generation system used with a laser apparatus, the extreme ultraviolet light generation system comprising:
 a chamber including at least one window for first and second laser beams and a target supply unit for supplying a droplet of a target material into the chamber;
 a collector mirror provided in the chamber and configured for selectively reflecting at least ultraviolet light emitted from a plasma generated by irradiating the droplet with the first and second laser beams;
 a first polarization control unit, provided on a light path of the first laser beam, for converting the first laser beam into one of a radially polarized laser beam, an azimuthally polarized laser beam and an elliptically polarized laser beam; and
 a second polarization control unit on a light path of the second laser beam, for converting the second laser beam into one of a radially polarized laser beam, an azimuthally polarized laser beam and an elliptically polarized laser beam, wherein:
 the first laser beam strikes the droplet not having been irradiated with a laser beam, and
 the second laser beam strikes the target material have been irradiated with the first laser beam.

2. The extreme ultraviolet light generation system according to claim 1, further comprising:
 a magnetic field generation unit, provided to the chamber, for generating a magnetic field in which a charged particle emitted from the target material that has been struck by the second laser beam is trapped; and
 a collection unit into which the trapped charged particle is collected.

3. A laser apparatus for outputting a laser beam used to generate extreme ultraviolet light, the laser apparatus comprising:
 a laser source that outputs a first laser beam and a second laser beam:
 a first polarization control unit, provided on a light path of the first laser beam, for converting the first laser beam into one of a radially polarized laser beam, an azimuthally polarized laser beam and an elliptically polarized laser beam;
 a second polarization control unit on a light path of the second laser beam, for converting the second laser beam into one of a radially polarized laser beam, an azimuthally polarized laser beam and an elliptically polarized laser beam; and
 a target supply unit that supplies a droplet of a target, wherein:
 the first laser beam strikes the droplet not having been irradiated with a laser beam, and
 the second laser beam strikes the target material have been irradiated with the first laser beam.

4. A method for generating extreme ultraviolet light by irradiating a target material with at least one laser beam, the method comprising:
 outputting a first laser beam and a second laser beam;
 converting a polarization state of the first laser beam into one of a radially polarized laser beam, an azimuthally polarized laser beam and an elliptically polarized laser beam;
 converting a polarization state of the second laser beam into one of a radially polarized laser beam, an azimuthally polarized laser beam and an elliptically polarized laser beam;
 irradiating the droplet, which has not been irradiated with a laser beam, with the first laser beam; and
 irradiating the target material, which has been irradiated with the first laser beam, with the second laser beam.

* * * * *